United States Patent
Zheng et al.

(10) Patent No.: US 9,952,767 B2
(45) Date of Patent: Apr. 24, 2018

(54) CONSISTENCY GROUP MANAGEMENT

(71) Applicant: NetApp, Inc., Sunnyvale, CA (US)

(72) Inventors: Ling Zheng, Saratoga, CA (US); Ning Zhao, San Jose, CA (US); Radek Aster, Campbell, CA (US); Jeffrey S. Kimmel, Chapel Hill, NC (US)

(73) Assignee: NetApp, Inc., Sunnyvale, CA (US)

( * ) Notice: Subject to any disclaimer, the term of this patent is extended or adjusted under 35 U.S.C. 154(b) by 8 days.

(21) Appl. No.: 15/142,767

(22) Filed: Apr. 29, 2016

(65) Prior Publication Data

US 2017/0315728 A1 Nov. 2, 2017

(51) Int. Cl.
*G06F 3/06* (2006.01)

(52) U.S. Cl.
CPC ............ *G06F 3/0604* (2013.01); *G06F 3/067* (2013.01); *G06F 3/0656* (2013.01)

(58) Field of Classification Search
CPC ...... G06F 3/0604; G06F 3/0644; G06F 3/065; G06F 3/0656; G06F 3/0665; G06F 3/067; G06F 12/0646
USPC ................. 711/154, 162, 170, 203
See application file for complete search history.

(56) References Cited

U.S. PATENT DOCUMENTS

| | | | |
|---|---|---|---|
| 5,937,425 A | 8/1999 | Ban | |
| 6,219,800 B1 | 4/2001 | Johnson et al. | |
| 7,249,150 B1 | 7/2007 | Watanabe et al. | |
| 7,680,837 B2 | 3/2010 | Yamato | |
| 7,996,636 B1 | 8/2011 | Prakash et al. | |
| 8,082,390 B1 | 12/2011 | Fan et al. | |
| 8,099,396 B1 | 1/2012 | Novick et al. | |
| 8,140,860 B2 | 3/2012 | Haswell | |
| 8,156,290 B1 | 4/2012 | Vanninen et al. | |
| 8,205,065 B2 | 6/2012 | Matze | |

(Continued)

OTHER PUBLICATIONS

Cornwall, Michael, "Anatomy of a Solid-state Drive," ACM Queue—Networks, vol. 10, No. 10, Oct. 2012, pp. 1-7.

(Continued)

*Primary Examiner* — Gary J Portka
(74) *Attorney, Agent, or Firm* — Cesari and McKenna, LLP

(57) ABSTRACT

A consistency group is used as a basic unit of data management of storage containers served by a storage input/output (I/O) stack executing on one or more nodes of a cluster. The storage container may be a LUN embodied as parent volume (active volume), a snapshot (represented as an independent volume embodied as read-only copy of the active volume), and a clone (represented as another independent volume embodied as a read-write copy (clone) of the active volume). A consistency group (CG) is a set (i.e., collection) of objects, e.g., LUNs or other CGs (nested CG), which may be managed and operated upon collectively by an administrative command via a Storage Area Network administration layer (SAL) of the storage I/O stack. The SAL may interact with one or more layers of the storage I/O stack to (i) create a clone of a set of object members of the CG; (ii) create one or more snapshots of the set of object members of the CG; (iii) restore the set of object members of the CG from a group of CG snapshots; (iv) replicate the set of object members of the CG as a single entity; and (v) delete a CG and a nested CG according to specific semantics.

18 Claims, 17 Drawing Sheets

(56) References Cited

U.S. PATENT DOCUMENTS

| | | |
|---|---|---|
| 8,341,457 B2 | 12/2012 | Spry et al. |
| 8,417,987 B1 | 4/2013 | Goel et al. |
| 8,495,417 B2 | 7/2013 | Jernigan, IV et al. |
| 8,539,008 B2 | 9/2013 | Faith et al. |
| 8,560,879 B1 | 10/2013 | Goel |
| 8,589,625 B2 | 11/2013 | Colgrove et al. |
| 8,595,595 B1 | 11/2013 | Grcanac et al. |
| 8,732,426 B2 | 5/2014 | Colgrove et al. |
| 8,775,868 B2 | 7/2014 | Colgrove et al. |
| 8,832,373 B2 | 9/2014 | Colgrove et al. |
| 2002/0091897 A1 | 7/2002 | Chiu et al. |
| 2003/0120869 A1 | 6/2003 | Lee et al. |
| 2003/0191916 A1 | 10/2003 | McBrearty et al. |
| 2005/0144514 A1 | 6/2005 | Ulrich et al. |
| 2007/0143359 A1 | 6/2007 | Uppala |
| 2008/0184063 A1* | 7/2008 | Abdulvahid ........ G06F 11/1469 714/6.3 |
| 2008/0270719 A1* | 10/2008 | Cochran ............ G06F 11/1435 711/162 |
| 2010/0042790 A1 | 2/2010 | Mondal et al. |
| 2010/0088296 A1 | 4/2010 | Periyagaram et al. |
| 2011/0035548 A1 | 2/2011 | Kimmel et al. |
| 2011/0213928 A1 | 9/2011 | Grube et al. |
| 2012/0079318 A1 | 3/2012 | Colgrove et al. |
| 2012/0084506 A1 | 4/2012 | Colgrove et al. |
| 2012/0290788 A1 | 11/2012 | Klemm et al. |
| 2013/0018854 A1 | 1/2013 | Condict |
| 2013/0019057 A1 | 1/2013 | Stephens |
| 2013/0138862 A1 | 5/2013 | Motwani et al. |
| 2013/0238832 A1 | 9/2013 | Dronamraju et al. |
| 2013/0238932 A1 | 9/2013 | Resch |
| 2013/0268497 A1 | 10/2013 | Baldwin et al. |
| 2013/0346810 A1 | 12/2013 | Kimmel et al. |
| 2014/0059309 A1* | 2/2014 | Brown ................ G06F 11/1662 711/162 |
| 2014/0215129 A1 | 7/2014 | Kuzmin et al. |
| 2014/0379965 A1 | 12/2014 | Gole et al. |
| 2017/0031769 A1 | 2/2017 | Bolen et al. |
| 2017/0031774 A1 | 2/2017 | Zheng et al. |
| 2017/0032013 A1 | 2/2017 | Zheng et al. |

OTHER PUBLICATIONS

"Cuckoo hashing," Wikipedia, http://en.wikipedia.org/wiki/Cuckoo_hash, Apr. 2013, pp. 1-5.
Culik, K., et al., "Dense Multiway Trees," ACM Transactions on Database Systems, vol. 6, Issue 3, Sep. 1981, pp. 486-512.
Debnath, Biplob, et al., "FlashStore:.High Throughput Persistent Key-Value Store," Proceedings of the VLDB Endowment VLDB Endowment, vol. 3, Issue 1-2, Sep. 2010, pp. 1414-1425.
Gal, Eran et al., "Algorithms and Data Structures for Flash Memories," ACM Computing Surveys, vol. 37, No. 2, Jun. 2005, pp. 138-163.
Gray, Jim et al., "Flash Disk Opportunity for Server Applications," Queue—Enterprise Flash Storage, vol. 6, Issue 4, Jul.-Aug. 2008, pp. 18-23.
Handy, Jim, "SSSI Tech Notes: How Controllers Maximize SSD Life," SNIA, Jan. 2013, pp. 1-20.
Hwang, Kai et al., "RAID-x: A New Distributed Disk Array for I/O-centric Cluster Computing", IEEE High-Performance Distributed Computing, Aug. 2000, pp. 279-286.
Leventhal, Adam H., "A File System All Its Own," Communications of the ACM Queue, vol. 56, No. 5, May 2013, pp. 64-67.
Lim, H. et al., "SILT: A Memory-Efficient, High-Performance Key-Value Store," Proceedings of the $23^{rd}$ ACM Symposium on Operating Systems Principles (SOSP'11), Oct. 23-26, 2011, pp. 1-13.
Moshayedi, Mark, et al., "Enterprise SSDs," ACM Queue—Enterprise Flash Storage, vol. 6 No. 4, Jul.-Aug. 2008, pp. 32-39.
Ongaro, Diego et al., "In Search of an Understandable Consensus Algorithm," Stanford University, May 2013. Downloaded from https://ramcloud.stanford.edu/wiki/download/attachments/11370504/raft.pdf, 14 pages.
Pagh, Rasmus, et al., "Cuckoo Hashing," Elsevier Science, Dec. 8, 2003, pp. 1-27.
Pagh, Rasmus, "Cuckoo Hashing for Undergraduates," IT University of Copenhagen, Mar. 27, 2006, pp. 1-6.
Rosenblum, Mendel, et al., "The Design and Implementation of a Log-Structured File System," Proceedings of the $13^{th}$ ACM Symposium on Operating Systems Principles, Jul. 24, 1991, pp. 1-15.
Rosenblum, Mendel, et al., "The LFS Storage Manager," Summer '90 USENIX Technical Conference, Anaheim, California, Jun. 1990, pp. 1-16.
Rosenblum, Mendel, "The Design and Implementation of a Log-structured File System," UC Berkeley, Thesis, 1992, pp. 1-101.
Seltzer, Margo, et al., "An Implementation of a Log Structured File System for UNIX," Winter USENIX, San Diego, CA, Jan. 25-29, 1993, pp. 1-18.
Seltzer, Margo, et al., "File System Performance and Transaction Support," UC Berkeley, Thesis, 1992, pp. 1-131.
Smith, Kent, "Garbage Collection," SandForce, Flash Memory Summit, Santa Clara, CA, Aug. 2011, pp. 1-9.
Twigg, Andy, et al., "Stratified B-trees and Versioned Dictionaries," Proceedings of the 3rd USENIX Conference on Hot Topics in Storage and File Systems, vol. 11, 2011, pp. 1-5.
Wu, Po-Liang, et al., "A File-System-Aware FTL Design for Flash-Memory Storage Systems," Design, Automation & Test in Europe Conference & Exhibition, IEEE, 2009, pp. 1-6.

* cited by examiner

| TYPE 612 | OFFSET 614 | LENGTH 616 | EXTENT KEY 618 |

DATA ENTRY (D) 610

| TYPE 622 | OFFSET 624 | LENGTH 626 | PAGE KEY 628 |

INDEX ENTRY (I) 620

| TYPE 632 | OFFSET 634 | LENGTH 636 | |

HOLE ENTRY (HD) 630

FIG. 6

CONSISTENCY GROUP MANAGEMENT

BACKGROUND

Technical Field

The present disclosure relates to storage systems and, more specifically, to collective data management of storage containers in a storage system.

Background Information

A storage system typically includes one or more storage devices, such as solid state drives (SSDs), into which information may be entered, and from which information may be obtained, as desired. The storage system may implement a high-level module, such as a file system, to logically organize the information stored on the devices as storage containers, such as volumes or logical units (LUNs). Each storage container may be implemented as a set of data structures, including data blocks that store data for the storage containers and metadata blocks that describe the data of the storage containers. For example, the metadata may describe, e.g., identify, storage locations on the devices for the data.

Management of the storage containers may include creation of snapshots (read-only) and/or clones (read-write) of the storage containers taken at points in time and accessed by one or more clients (hosts) of the storage system. Many client-based applications, such as databases, often operate on a group of storage containers collectively. As such, it is desirable to provide simplified administration of the storage containers by collective data management of those containers, e.g., snapshot and/or clone for each storage container using one command.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which:

FIG. 6 is a block diagram of a volume metadata entry;

OVERVIEW

The embodiments herein are directed to use of a consistency group as a basic unit of data management of storage containers served by a storage input/output (I/O) stack executing on one or more storage systems of a cluster. The storage container may be a LUN embodied as parent volume (active volume), a snapshot (represented as an independent volume embodied as read-only copy of the active volume), and a clone (represented as another independent volume embodied as a read-write copy (clone) of the active volume). As used herein, a consistency group (CG) is a set (i.e., collection) of objects, e.g., LUNs or other CGs (nested CG), which may be managed and operated upon collectively by an administrative command via a Storage Area Network administration layer (SAL) of the storage I/O stack. To that end, the SAL may interact with one or more layers of the storage I/O stack to (i) create a clone of a set of object members of the CG; (ii) create one or more snapshots of the set of object members of the CG; (iii) restore the set of object members of the CG from a group of CG snapshots; (iv) replicate the set of object members of the CG as a single entity; and (v) delete a CG and a nested CG according to specific semantics.

In an embodiment, creation of a clone of a CG results in a new CG plus a new LUN for each object member of the CG, while creation of a snapshot of a CG results in a single snapshot copy that includes all object members of the CG. Object members of the CG may have different snapshot creation and retention policies from the CG itself. Restoration of a snapshot (snap restore) may be performed from any CG snapshot, including an object of the CG. For example, snap restore of a LUN of the CG restores the LUN to a same state as exists in the CG snapshot. In addition, snap restore of a CG from the group of CG snapshots restores the CG to a same state as exists in the CG snapshot, including the same membership and state of all object members. Replication of a LUN results in a LUN replica, while replication of a CG results in a CG replica that includes a LUN replica for each original LUN member of the CG. Restoration of the CG replica results in a restored CG. Deletion of the CG results in child objects of the CG being promoted to a grand-parent CG rather than being destroyed, e.g., when CG "CG2" is deleted from hierarchy /CG1/CG2/LUN1, child object LUN1 is promoted upward to grandparent CG1, yielding /CG1/LUN1.

DESCRIPTION

Storage Cluster

Figure 1:
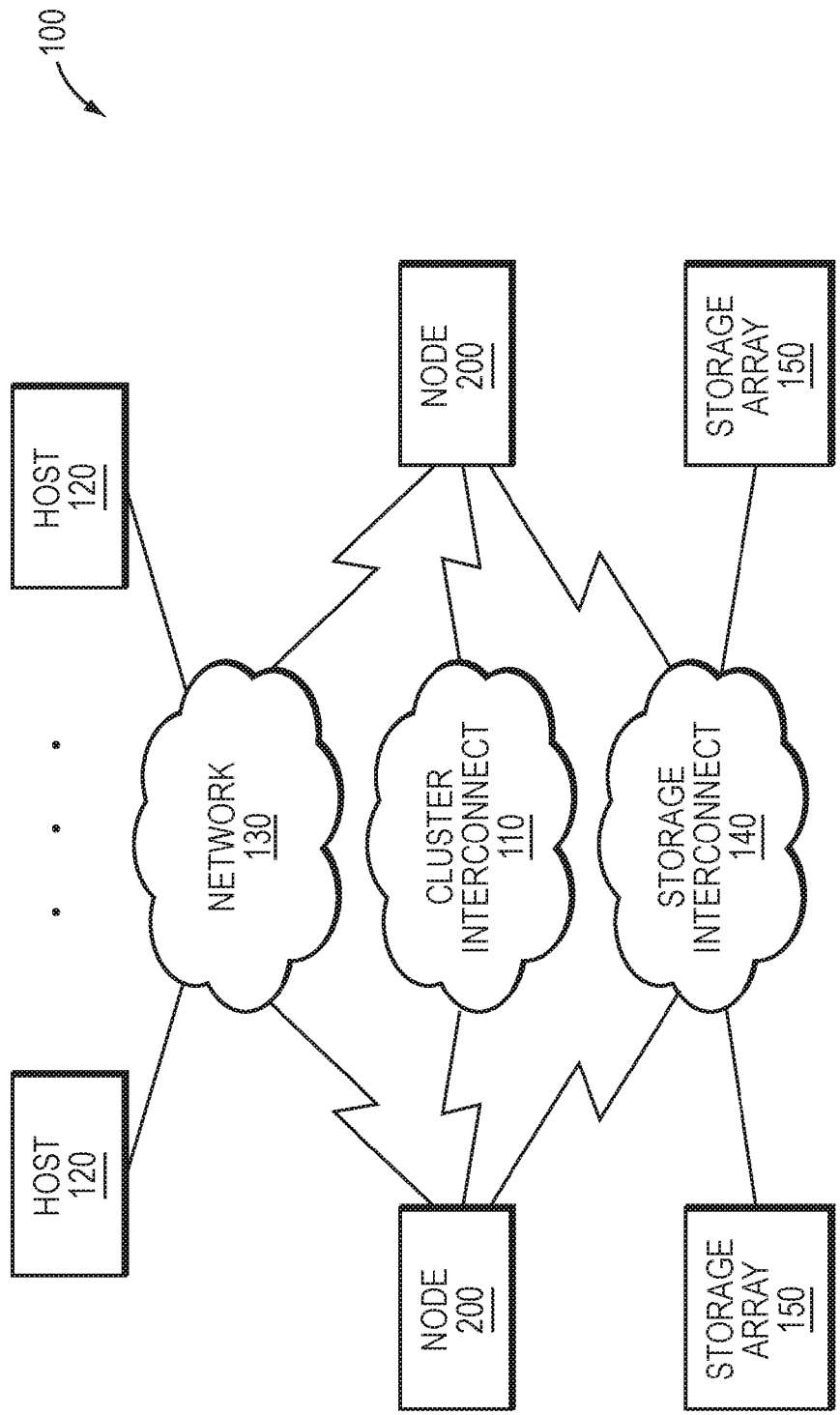
FIG. 1 is a block diagram of a plurality of nodes interconnected as a cluster.

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container stored on the cluster 100.

Figure 2:
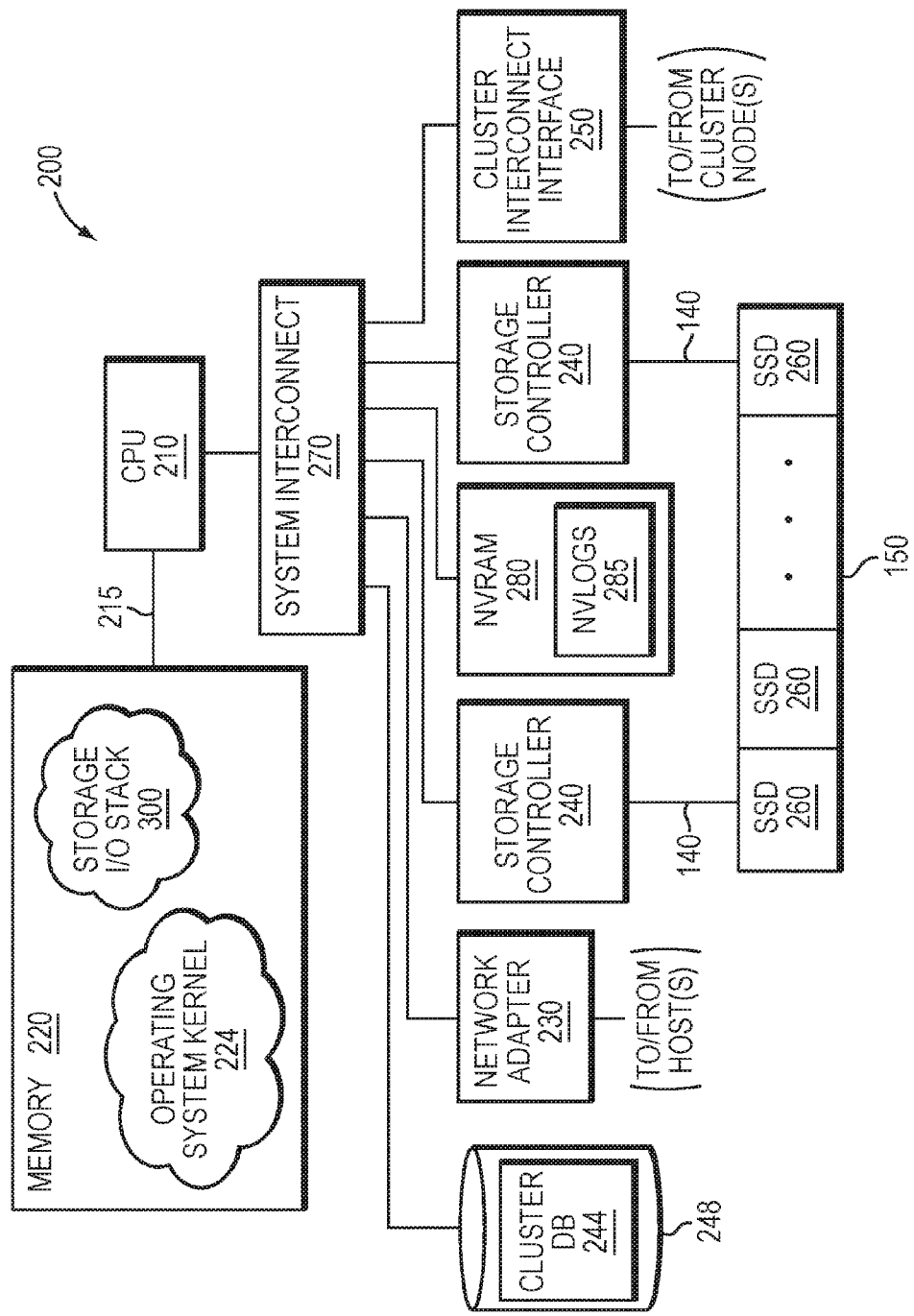
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, storage controllers 240, a cluster interconnect interface 250 and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network. In an embodiment, the network adapter 230 may be an iSCSI target host bus adapter (SCSI target) configured to accept iSCSI connections with the host.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements, such as a conventional serial ATA (SATA) topology or a PCI topology, may be used. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Infiniband may be used as the clustering protocol and interconnect fabric media, although it will be apparent to those skilled in the art that other types of protocols and interconnects may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
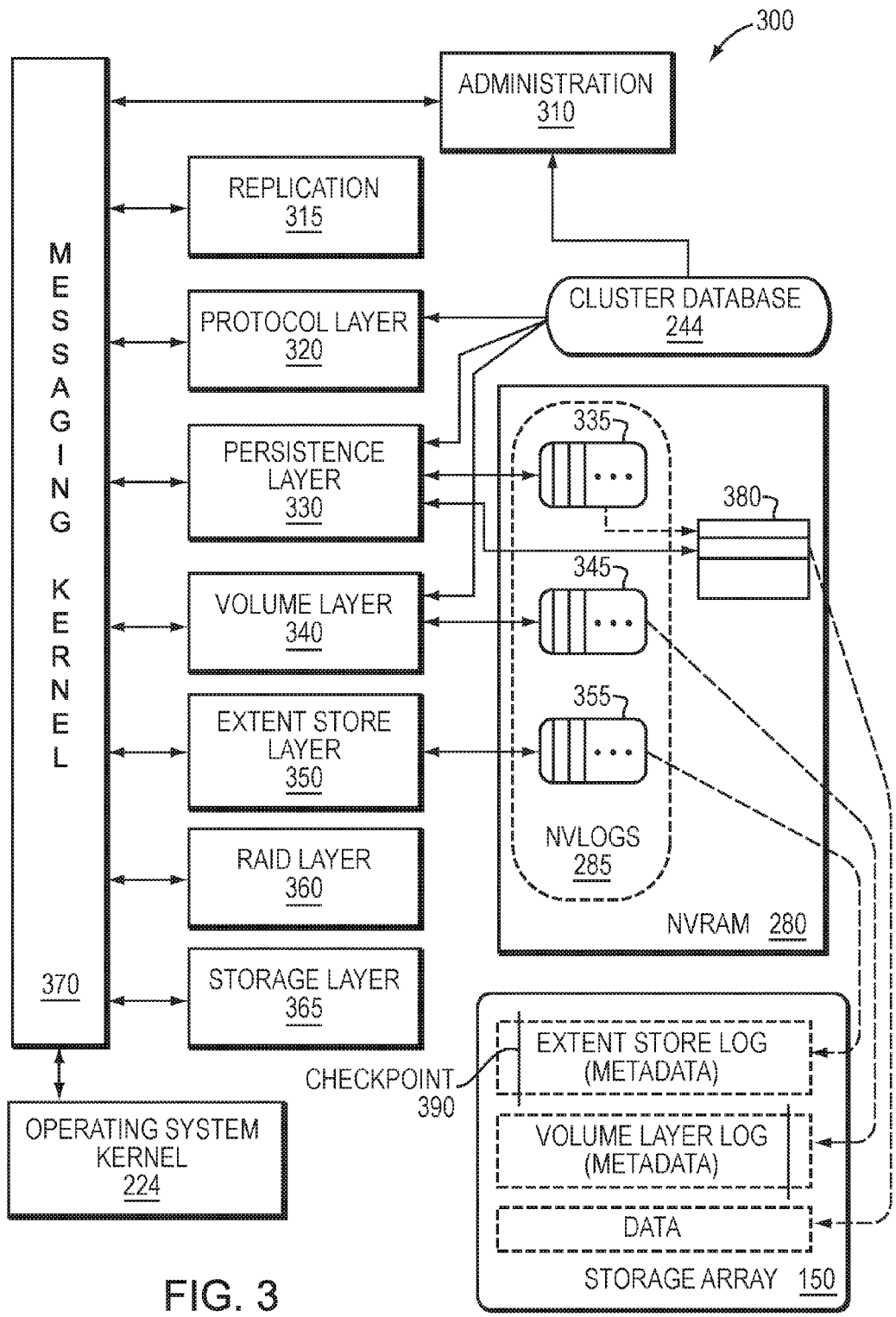
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes a Storage Area Network administration layer (SAL) 310, a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 380, illustratively embodied as a log whose contents can be replaced randomly, e.g., under some random access replacement policy rather than only in log fashion, and returns an acknowledgement to the host 120 via the protocol layer 320. In an embodiment only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. Notably, the write data for the write request may be physically stored in the log 355 such that the cache 380 contains the reference to the associated write data. That is, the write-back cache may be structured as a log. In an embodiment, a copy of the write-back cache may be also maintained in the memory 220 to facilitate direct memory access to the storage controllers. In other embodiments, caching may be performed at the host 120 or at a receiving node in accordance with a protocol that maintains coherency between the write data stored at the cache and the cluster.

In an embodiment, the SAL 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset and length, hereinafter offset and range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The SAL 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request, as well as translate the LBA (or LBA range) into an offset and length within the volume. Specifically, the volume ID is used to determine a volume layer instance that manages volume metadata associated with the LBA or LBA range. As noted, the protocol layer may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the SAL layer 310. The volume metadata is illustratively embodied as in-core mappings from LUN addresses (i.e., LBAs) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the host provides distribution of extents among the storage containers and cluster-wide (across containers) de-duplication is infrequent. An extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with retirement of log entries, while a checkpoint (e.g., synchronization) operation stores in-core metadata on the array 150. That is, the checkpoint operation (checkpoint) ensures that a consistent state of metadata, as processed in-core, is committed to (stored on) the storage array 150; whereas the retirement of log entries ensures that the entries accumulated in the volume layer log 345 synchronize with the metadata checkpoints committed to the storage array 150 by, e.g., retiring those accumulated log entries prior to the checkpoint. In one or more embodiments, the checkpoint and retirement of log entries may be data driven, periodic or both.

In an embodiment, the extent store layer 350 is responsible for storing extents on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). In an alternative embodiment, the extent store layer 350 is responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoint with incremental changes that span multiple log files) in which selected in-core mappings, less than the total, are committed to the array 150 at various intervals (e.g., driven by an amount of change to the in-core mappings, size thresholds of log 355, or periodically). Notably, the accumulated entries in log 355 may be retired once all in-core mappings have been committed and then, illustratively, for those entries prior to the first interval.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth), e.g., in accordance with a plurality of contiguous range write operations, so as to reduce data relocation (i.e., internal flash block management) that may occur within the SSDs as a result of the operations. In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
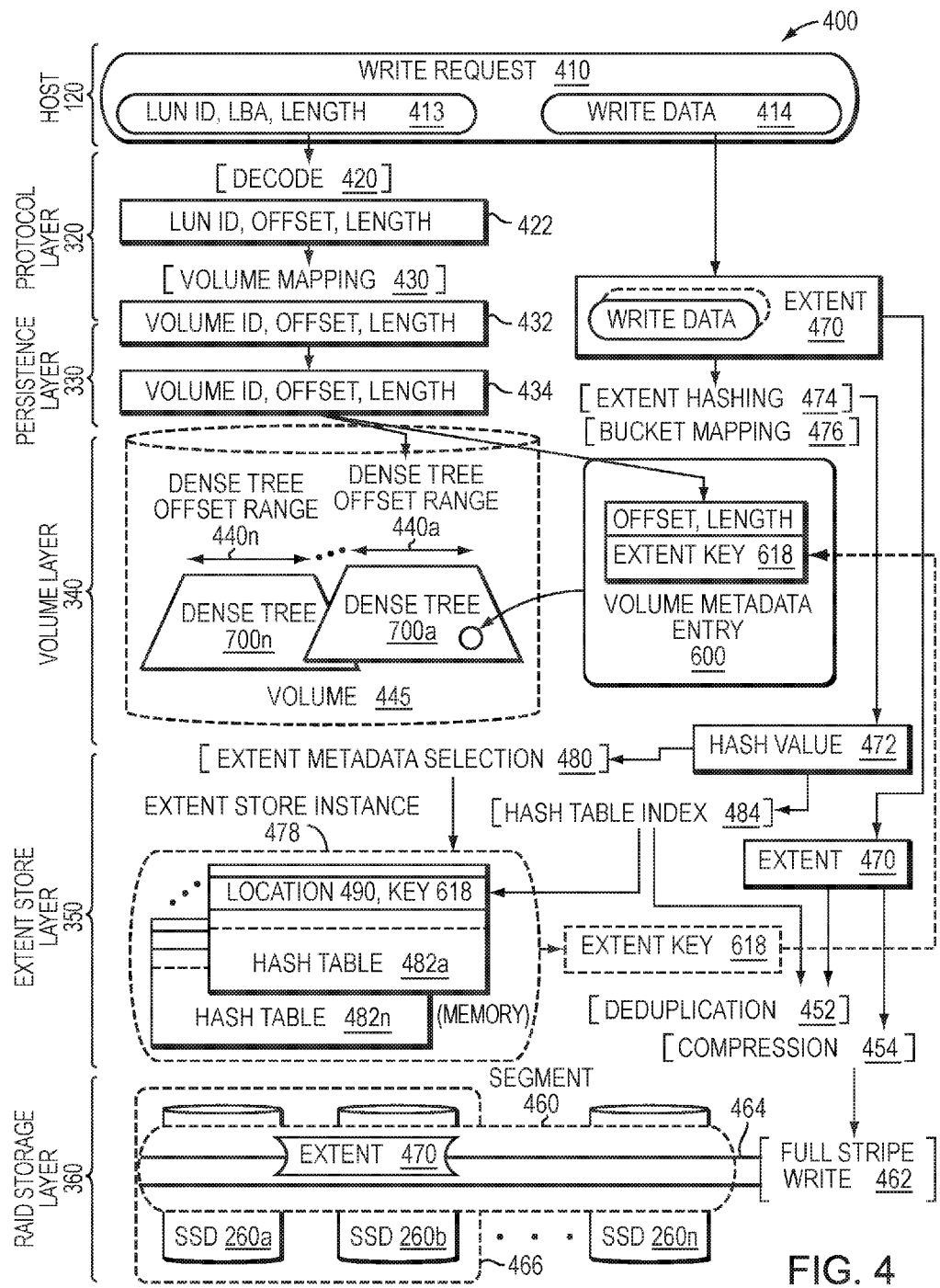
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage arrays 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer 320 may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistence layer log 335 and returns an acknowledgement to the host 120 via the protocol layer 320. As described herein, the persistence layer 330 may aggregate and organize write data 414 from one or more write requests into a new extent 470 and perform a hash computation, i.e., a hash function, on the new extent to generate a hash value 472 in accordance with an extent hashing technique 474.

The persistence layer 330 may then pass the write request with aggregated write data including, e.g., the volume ID, offset and length, as parameters 434 to the appropriate volume layer instance. In an embodiment, message passing of the parameters 434 (received by the persistence layer) may be redirected to another node via the function shipping mechanism, e.g., RPC, for inter-node communication. Alternatively, message passing of the parameters 434 may be via the IPC mechanism, e.g., message threads, for intra-node communication.

In one or more embodiments, a bucket mapping technique 476 is provided that translates the hash value 472 to an instance of an appropriate extent store layer (e.g., extent store instance 478) that is responsible for storing the new extent 470. Note that the bucket mapping technique may be implemented in any layer of the storage I/O stack above the extent store layer. In an embodiment, for example, the bucket mapping technique may be implemented in the persistence layer 330, the volume layer 340, or a layer that manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 476 described herein. The persistence layer 330 may then pass the hash value 472 and the new extent 470 to the appropriate volume layer instance and onto the appropriate extent store instance via an extent store put operation. The extent hashing technique 474 may embody an approximately uniform hash function to ensure that any random extent to be written may have an approximately equal chance of falling into any extent store instance 478, i.e., hash buckets are evenly distributed across extent store instances of the cluster 100 based on available resources. As a result, the bucket mapping technique 476 provides load-balancing of write operations (and, by symmetry, read operations) across nodes 200 of the cluster, while also leveling flash wear in the SSDs 260 of the cluster.

In response to the put operation, the extent store instance may process the hash value 472 to perform an extent metadata selection technique 480 that (i) selects an appropriate hash table 482 (e.g., hash table 482a) from a set of hash tables (illustratively in-core) within the extent store instance 478, and (ii) extracts a hash table index 484 from the hash value 472 to index into the selected hash table and lookup a table entry having an extent key 618 identifying a storage location 490 on SSD 260 for the extent. Accordingly, the persistence layer 330, the volume layer 340, or the cluster layer may contain computer executable instructions executed by the CPU 210 to perform operations that implement the extent metadata selection technique 480 described herein. If a table entry with a matching extent key is found, then the SSD location 490 mapped from the extent key 618 is used to retrieve an existing extent (not shown) from SSD. The existing extent is then compared with the new extent 470 to determine whether their data is identical. If the data is identical, the new extent 470 is already stored on SSD 260 and a de-duplication opportunity (denoted de-duplication 452) exists such that there is no need to write another copy of the data. Accordingly, a reference count (not shown) in the table entry for the existing extent is incremented and the extent key 618 of the existing extent is passed to the appropriate volume layer instance for storage within an entry (denoted as volume metadata entry 600) of a dense tree metadata structure (e.g., dense tree 700a), such that the extent key 618 is associated an offset range 440 (e.g., offset range 440a) of the volume 445.

However, if the data of the existing extent is not identical to the data of the new extent 470, a collision occurs and a deterministic algorithm is invoked to sequentially generate as many new candidate extent keys (not shown) mapping to the same bucket as needed to either provide de-duplication 452 or produce an extent key that is not already stored within the extent store instance. Notably, another hash table (e.g. hash table 482n) may be selected by a new candidate extent key in accordance with the extent metadata selection technique 480. In the event that no de-duplication opportunity exists (i.e., the extent is not already stored) the new extent 470 is compressed in accordance with compression technique 454 and passed to the RAID layer 360, which processes the new extent 470 for storage on SSD 260 within one or more stripes 464 of RAID group 466. The extent store instance may cooperate with the RAID layer 360 to identify a storage segment 460 (i.e., a portion of the storage array 150) and a location on SSD 260 within the segment 460 in which to store the new extent 470. Illustratively, the identified storage segment is a segment with a large contiguous free space having, e.g., location 490 on SSD 260b for storing the extent 470.

In an embodiment, the RAID layer 360 then writes the stripes 464 across the RAID group 466, illustratively as one or more full stripe write 462. The RAID layer 360 may write a series of stripes 464 of sufficient depth to reduce data relocation that may occur within the flash-based SSDs 260 (i.e., flash block management). The extent store instance then (i) loads the SSD location 490 of the new extent 470 into the selected hash table 482n (i.e., as selected by the new candidate extent key) and (ii) passes a new extent key (denoted as extent key 618) to the appropriate volume layer instance for storage within an entry (also denoted as volume metadata entry 600) of a dense tree 700 managed by that volume layer instance, and (iii) records a change to extent metadata of the selected hash table in the extent store layer log 355. Illustratively, the volume layer instance selects dense tree 700a spanning an offset range 440a of the volume 445 that encompasses the offset range of the write request. As noted, the volume 445 (e.g., an offset space of the volume) is partitioned into multiple regions (e.g., allotted as disjoint offset ranges); in an embodiment, each region is represented by a dense tree 700. The volume layer instance then inserts the volume metadata entry 600 into the dense tree 700a and records a change corresponding to the volume metadata entry in the volume layer log 345. Accordingly, the I/O (write) request is sufficiently stored on SSD 260 of the cluster.

Read Path

Figure 5:
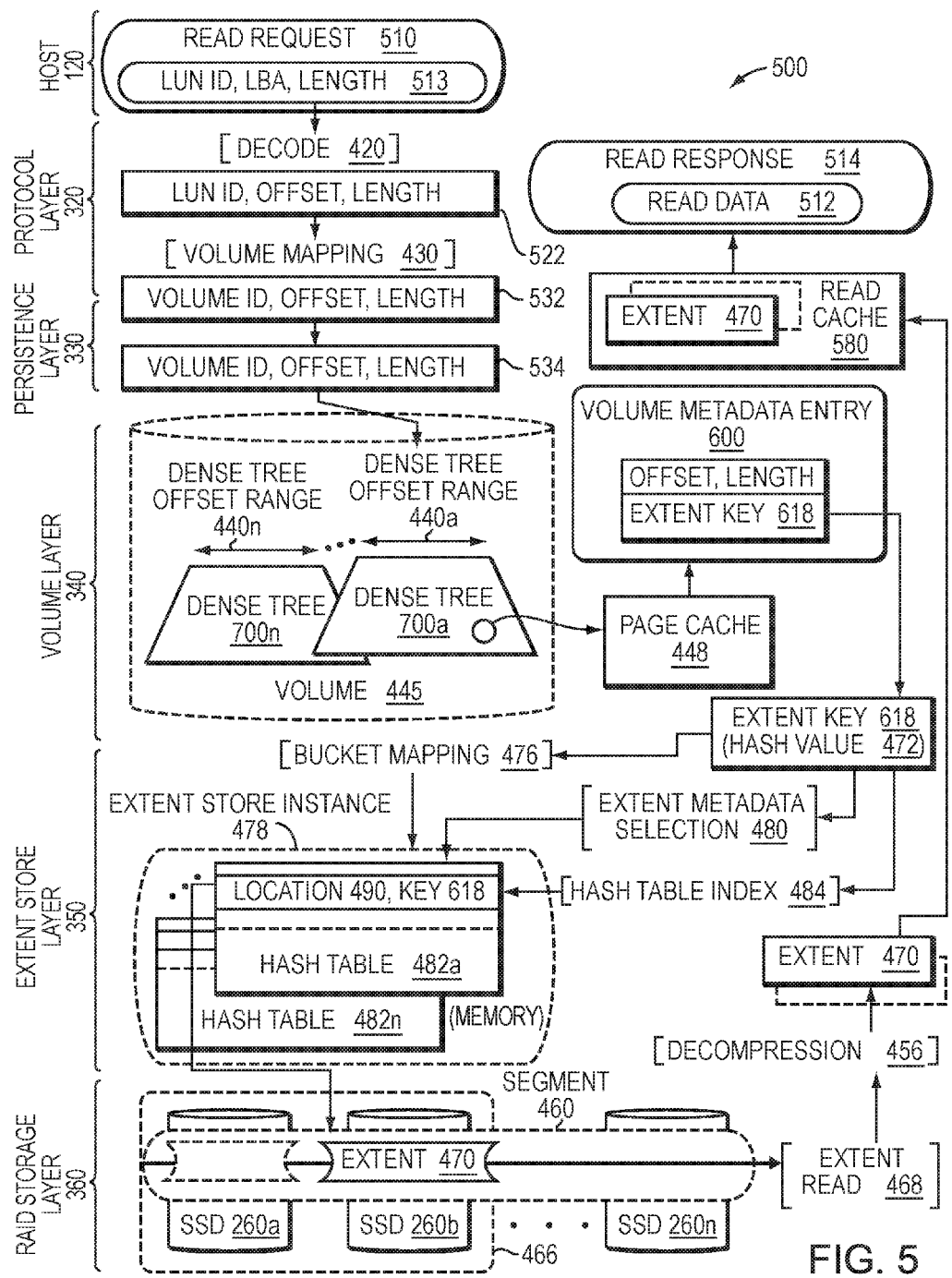
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write cache 380 to determine whether some or all of the read request can be service from its cache data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism (e.g., RPC, for inter-node communication) or the IPC mechanism (e.g., message threads, for intra-node communication).

The volume layer instance may process the read request to access a dense tree metadata structure (e.g., dense tree 700a) associated with a region (e.g., offset range 440a) of a volume 445 that encompasses the requested offset range (specified by parameters 532). The volume layer instance may further process the read request to search for (lookup) one or more volume metadata entries 600 of the dense tree 700a to obtain one or more extent keys 618 associated with one or more extents 470 within the requested offset range. As described further herein, each dense tree 700 may be embodied as multiple levels of a search structure with possibly overlapping offset range entries at each level. The entries, i.e., volume metadata entries 600, provide mappings from host-accessible LUN addresses, i.e., LBAs, to durable extent keys. The various levels of the dense tree may have volume metadata entries 600 for the same offset, in which case the higher level has the newer entry and is used to service the read request. A top level of the dense tree 700 is illustratively resident in-core and a page cache 448 may be used to access lower levels of the tree. If the requested range or portion thereof is not present in the top level, a metadata page associated with an index entry at the next lower tree level is accessed. The metadata page (i.e., in the page cache 448) at the next level is then searched (e.g., a binary search) to find any overlapping entries. This process is then iterated until one or more volume metadata entries 600 of a level are found to ensure that the extent key(s) 618 for the entire requested read range are found. If no metadata entries exist for the entire or portions of the requested read range, then the missing portion(s) are zero filled.

Once found, each extent key 618 is processed by the volume layer 340 to, e.g., implement the bucket mapping technique 476 that translates the extent key to an appropriate extent store instance 478 responsible for storing the requested extent 470. Note that, in an embodiment, each extent key 618 may be substantially identical to the hash value 472 associated with the extent 470, i.e., the hash value as calculated during the write request for the extent, such that the bucket mapping 476 and extent metadata selection 480 techniques may be used for both write and read path operations. Note also that the extent key 618 may be derived from the hash value 472. The volume layer 340 may then pass the extent key 618 (i.e., the hash value from a previous write request for the extent) to the appropriate extent store instance 478 (via an extent store get operation), which performs an extent key-to-SSD mapping to determine the location on SSD 260 for the extent.

In response to the get operation, the extent store instance may process the extent key 618 (i.e., hash value 472) to perform the extent metadata selection technique 480 that (i) selects an appropriate hash table (e.g., hash table 482*a*) from a set of hash tables within the extent store instance 478, and (ii) extracts a hash table index 484 from the extent key 618 (i.e., hash value 472) to index into the selected hash table and lookup a table entry having a matching extent key 618 that identifies a storage location 490 on SSD 260 for the extent 470. That is, the SSD location 490 mapped to the extent key 618 may be used to retrieve the existing extent (denoted as extent 470) from SSD 260 (e.g., SSD 260*b*). The extent store instance then cooperates with the RAID layer 360 to access the extent on SSD 260*b* and retrieve the data contents in accordance with the read request. Illustratively, the RAID layer 360 may read the extent in accordance with an extent read operation 468 and pass the extent 470 to the extent store instance. The extent store instance may then decompress the extent 470 in accordance with a decompression technique 456, although it will be understood to those skilled in the art that decompression can be performed at any layer of the storage I/O stack 300. The extent 470 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Dense Tree Volume Metadata

As noted, a host-accessible LUN may be apportioned into multiple volumes, each of which may be partitioned into one or more regions, wherein each region is associated with a disjoint offset range, i.e., a LBA range, owned by an instance of the volume layer 340 executing on a node 200. For example, assuming a maximum volume size of 64 terabytes (TB) and a region size of 16 gigabytes (GB), a volume may have up to 4096 regions (i.e., 16 GB×4096=64 TB). In an embodiment, region 1 may be associated with an offset range of, e.g., 0-16 GB, region 2 may be associated with an offset range of 16 GB-32 GB, and so forth. Ownership of a region denotes that the volume layer instance manages metadata, i.e., volume metadata, for the region, such that I/O requests destined to a LBA range within the region are directed to the owning volume layer instance. Thus, each volume layer instance manages volume metadata for, and handles I/O requests to, one or more regions. A basis for metadata scale-out in the distributed storage architecture of the cluster 100 includes partitioning of a volume into regions and distributing of region ownership across volume layer instances of the cluster.

Volume metadata, as well as data storage, in the distributed storage architecture is illustratively extent based. The volume metadata of a region that is managed by the volume layer instance is illustratively embodied as in memory (in-core) and on SSD (on-flash) volume metadata configured to provide mappings from host-accessible LUN addresses, i.e., LBAs, of the region to durable extent keys. In other words, the volume metadata maps LBA ranges of the LUN to data of the LUN (via extent keys) within the respective LBA range. In an embodiment, the volume layer organizes the volume metadata (embodied as volume metadata entries 600) as a data structure, i.e., a dense tree metadata structure (dense tree 700), which maps an offset range within the region to one or more extent keys. That is, the LUN data (user data) stored as extents (accessible via extent keys) is associated with LUN LBA ranges represented as volume metadata (also stored as extents).

FIG. 6 is a block diagram of a volume metadata entry 600 of the dense tree metadata structure. Each volume metadata entry 600 of the dense tree 700 may be a descriptor that embodies one of a plurality of types, including a data entry (D) 610, an index entry (I) 620, and a hole entry (H) 630. The data entry (D) 610 is configured to map (offset, length) to an extent key for an extent (user data) and includes the following content: type 612, offset 614, length 616 and extent key 618. The index entry (I) 620 is configured to map (offset, length) to a page key (e.g., and extent key) of a metadata page (stored as an extent), i.e., a page containing one or more volume metadata entries, at a next lower level of the dense tree; accordingly, the index entry 620 includes the following content: type 622, offset 624, length 626 and page key 628. Illustratively, the index entry 620 manifests as a pointer from a higher level to a lower level, i.e., the index entry 620 essentially serves as linkage between the different levels of the dense tree. The hole entry (H) 630 represents absent data as a result of a hole punching operation at (offset, length) and includes the following content: type 632, offset 634, and length 636.

Figure 7:
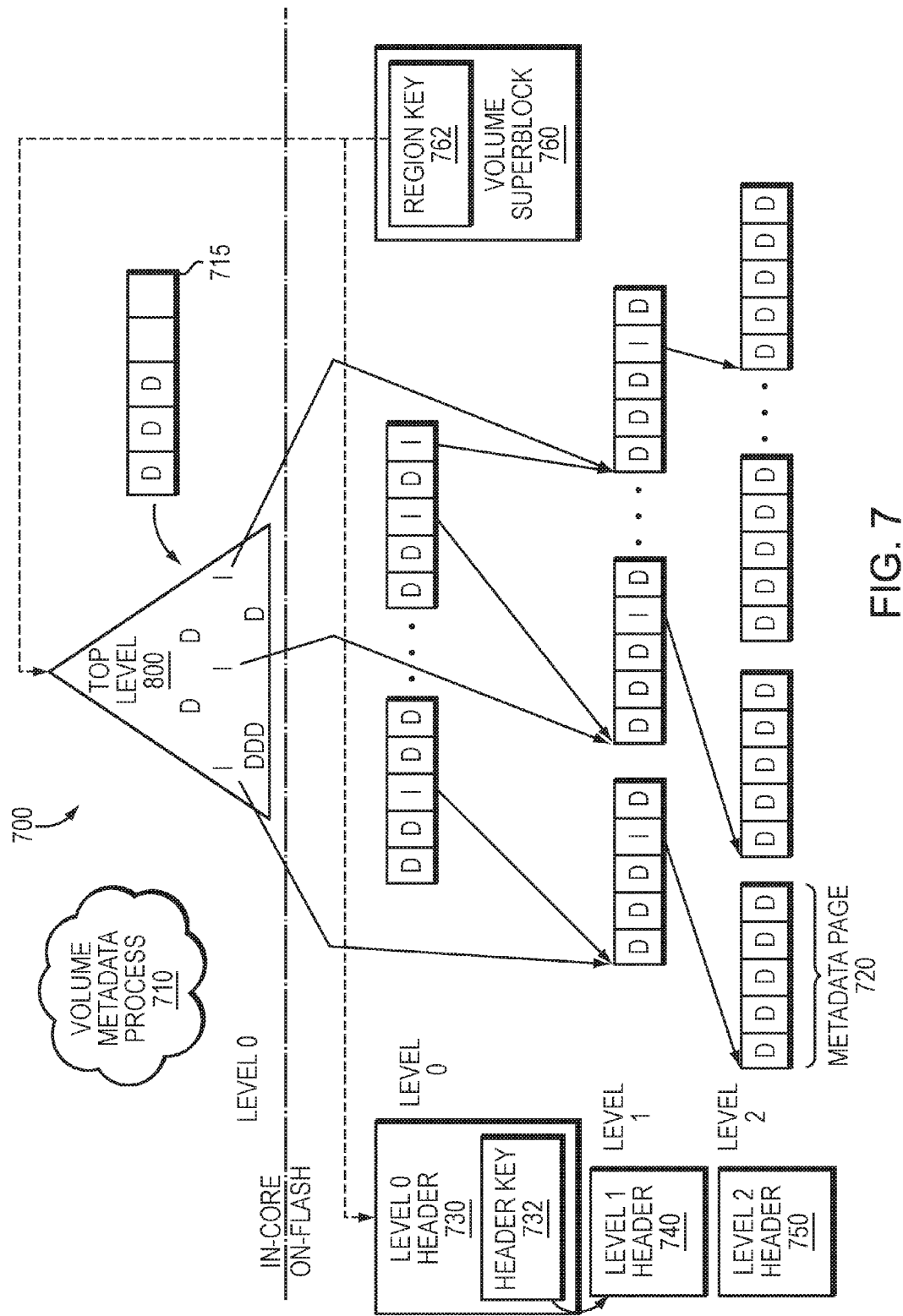
FIG. 7 is a block diagram of a dense tree metadata structure.

FIG. 7 is a block diagram of the dense tree metadata structure that may be advantageously used with one or more embodiments described herein. The dense tree metadata structure 700 is configured to provide mappings of logical offsets within a LUN (or volume) to extent keys managed by one or more extent store instances. Illustratively, the dense tree metadata structure is organized as a multi-level dense tree 700, where a top level 800 represents recent volume metadata changes and subsequent descending levels represent older changes. Specifically, a higher level of the dense tree 700 is updated first and, when that level fills, an adjacent lower level is updated, e.g., via a merge operation. A latest version of the changes may be searched starting at the top level of the dense tree and working down to the descending levels. Each level of the dense tree 700 includes fixed size records or entries, i.e., volume metadata entries 600, for storing the volume metadata. A volume metadata process 710 illustratively maintains the top level 800 of the dense tree in memory (in-core) as a balanced tree that enables indexing by offsets. The volume metadata process 710 also maintains a fixed sized (e.g., 4 KB) in-core buffer as a staging area (i.e., an in-core staging buffer 715) for volume metadata entries 600 inserted into the balanced tree (i.e., top level 800). Each level of the dense tree is further maintained on-flash as a packed array of volume metadata entries, wherein the entries are stored as extents illustratively organized as fixed sized (e.g., 4 KB) metadata pages 720. Notably, the staging buffer 715 is de-staged to SSD upon a trigger, e.g., the staging buffer is full. Each metadata page 720 has a unique identifier (ID) which guarantees that no two metadata pages can have the same content. Illustratively, metadata may not be de-duplicated by the extent store layer 350.

In an embodiment, the multi-level dense tree 700 includes three (3) levels, although it will be apparent to those skilled in the art that additional levels N of the dense tree may be included depending on parameters (e.g., size) of the dense tree configuration. Illustratively, the top level 800 of the tree is maintained in-core as level 0 and the lower levels are maintained on-flash as levels 1 and 2. In addition, copies of the volume metadata entries 600 stored in staging buffer 715 may also be maintained on-flash as, e.g., a level 0 linked list. A leaf level, e.g., level 2, of the dense tree contains data entries 610, whereas a non-leaf level, e.g., level 0 or 1, may contain both data entries 610 and index entries 620. Each index entry (I) 620 at level N of the tree is configured to point to (reference) a metadata page 720 at level N+1 of the tree. Each level of the dense tree 600 also includes a header (e.g., level 0 header 730, level 1 header 740 and level 2 header 750) that contains per level information, such as reference counts associated with the extents. Each upper level header contains a header key (an extent key for the header, e.g., header key 732 of level 0 header 730) to a corresponding lower level header. A region key 762 to a root, e.g., level 0 header 730 (and top level 800), of the dense tree 700 is illustratively stored on-flash and maintained in a volume root extent, e.g., a volume superblock 760. Notably, the volume superblock 760 contains region keys to the roots of the dense tree metadata structures for all regions in a volume.

Figure 8:
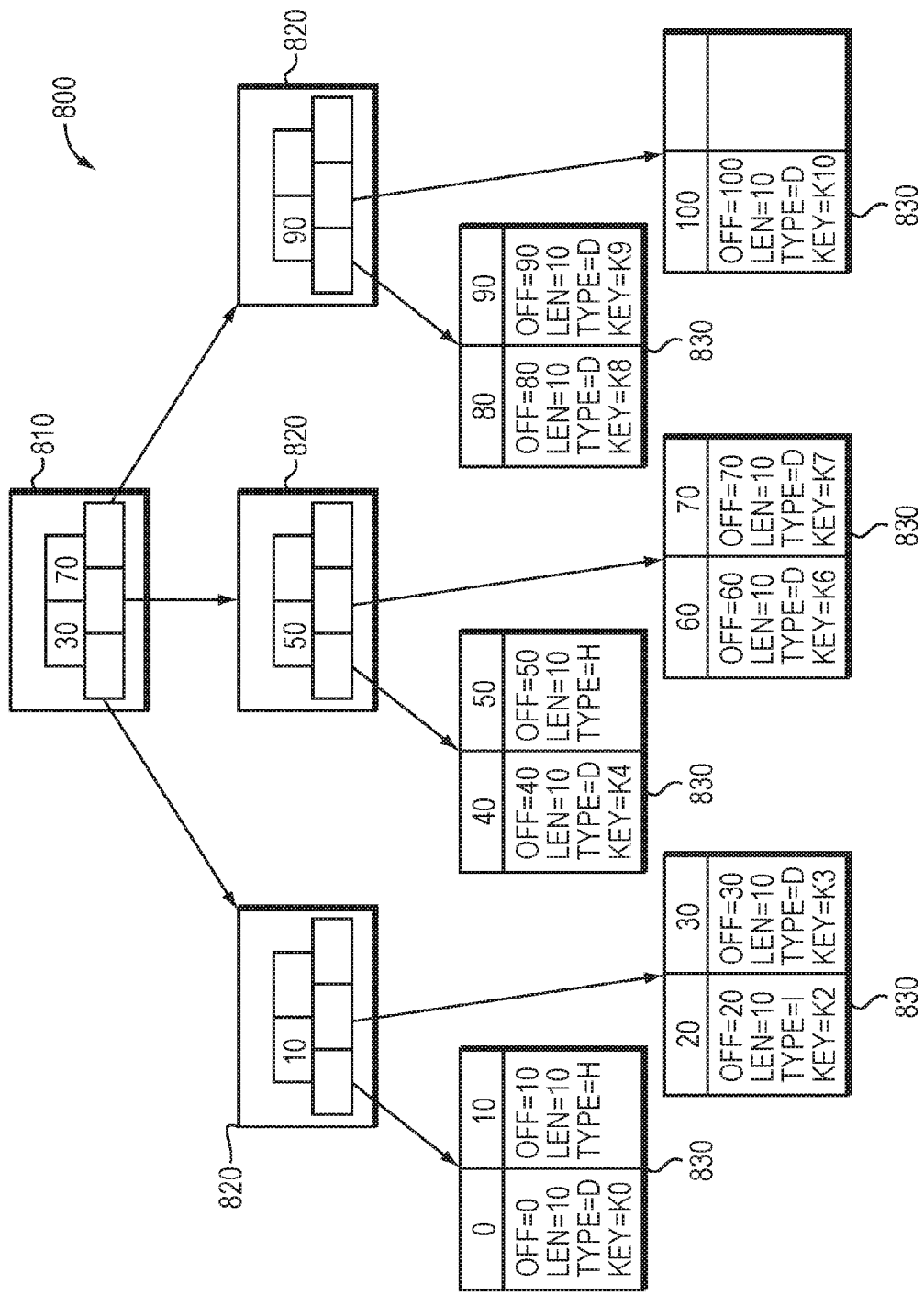
FIG. 8 is a block diagram of a top level of the dense tree metadata structure.

FIG. 8 is a block diagram of the top level 800 of the dense tree metadata structure. As noted, the top level (level 0) of the dense tree 700 is maintained in-core as a balanced tree, which is illustratively embodied as a B+ tree data structure. However, it will be apparent to those skilled in the art that other data structures, such as AVL trees, Red-Black trees, and heaps (partially sorted trees), may be advantageously used with the embodiments described herein. The B+ tree (top level 800) includes a root node 810, one or more internal nodes 820 and a plurality of leaf nodes (leaves) 830. The volume metadata stored on the tree is preferably organized in a manner that is efficient both to search in order to service read requests and to traverse (walk) in ascending order of offset to accomplish merges to lower levels of the tree. The B+ tree has certain properties that satisfy these requirements, including storage of all data (i.e., volume metadata entries 600) in leaves 830 and storage of the leaves as sequentially accessible, e.g., as one or more linked lists. Both of these properties make sequential read requests for write data (i.e., extents) and read operations for dense tree merge more efficient. Also, since it has a much higher fan-out than a binary search tree, the illustrative B+ tree results in more efficient lookup operations. As an optimization, the leaves 830 of the B+ tree may be stored in a page cache 448, making access of data more efficient than other trees. In addition, resolution of overlapping offset entries in the B+ tree optimizes read requests of extents. Accordingly, the larger the fraction of the B+ tree (i.e., volume metadata) maintained in-core, the less loading (reading) or metadata from SSD is required so as to reduce read amplification.

Figure 9:
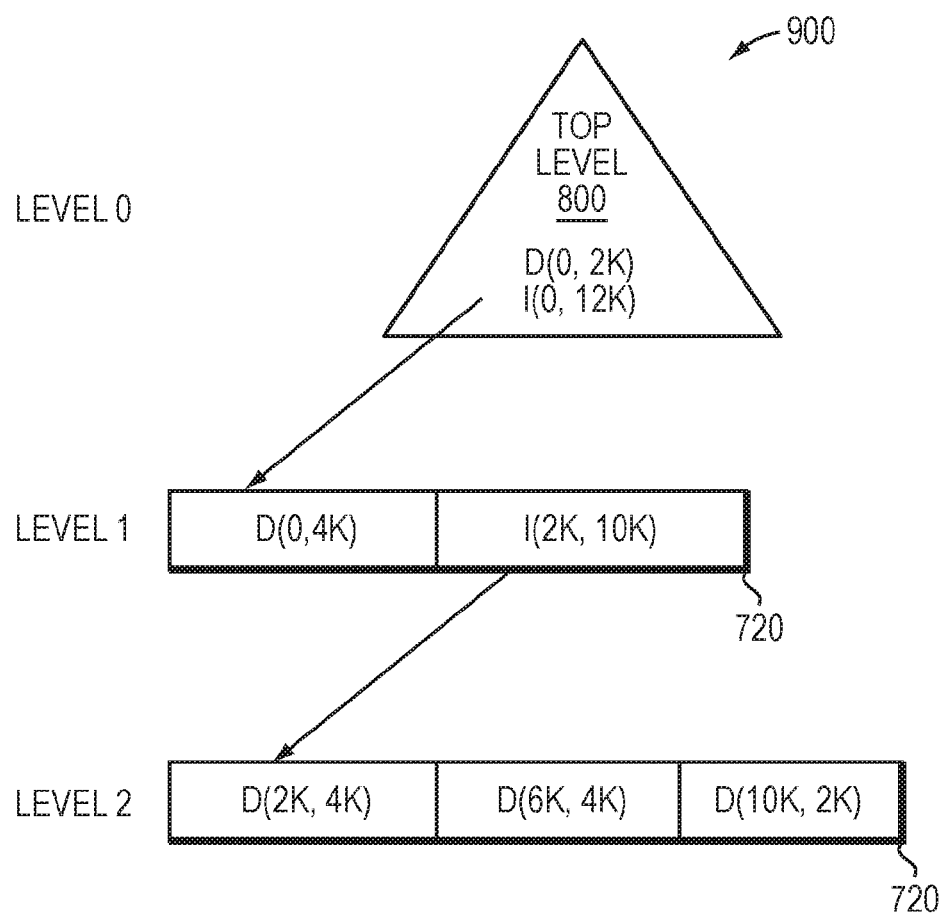
FIG. 9 illustrates mapping between levels of the dense tree metadata structure.

FIG. 9 illustrates mappings 900 between levels of the dense tree metadata structure. Each level of the dense tree 700 includes one or more metadata pages 720, each of which contains multiple volume metadata entries 600. In an embodiment, each volume metadata entry 600 has a fixed size, e.g., 12 bytes, such that a predetermined number of entries may be packed into each metadata page 720. As noted, the data entry (D) 610 is a map of (offset, length) to an address of (user) data which is retrievable using extent key 618 (i.e., from an extent store instance). The (offset, length) illustratively specifies an offset range of a LUN. The index entry (I) 620 is a map of (offset, length) to a page key 628 of a metadata page 720 at the next lower level. Illustratively, the offset in the index entry (I) 620 is the same as the offset of the first entry in the metadata page 720 at the next lower level. The length 626 in the index entry 620 is illustratively the cumulative length of all entries in the metadata page 720 at the next lower level (including gaps between entries).

For example, the metadata page 720 of level 1 includes an index entry "I(2K,10K)" that specifies a starting offset 2K and an ending offset 12K (i.e., 2K+10K=12K); the index entry (I) illustratively points to a metadata page 720 of level 2 covering the specified range. An aggregate view of the data entries (D) packed in the metadata page 720 of level 2 covers the mapping from the smallest offset (e.g., 2K) to the largest offset (e.g., 12K). Thus, each level of the dense tree 700 may be viewed as an overlay of an underlying level. For instance the data entry "D(0,4K)" of level 1 overlaps 2K of the underlying metadata in the page of level 2 (i.e., the range 2K,4K).

Figure 10:
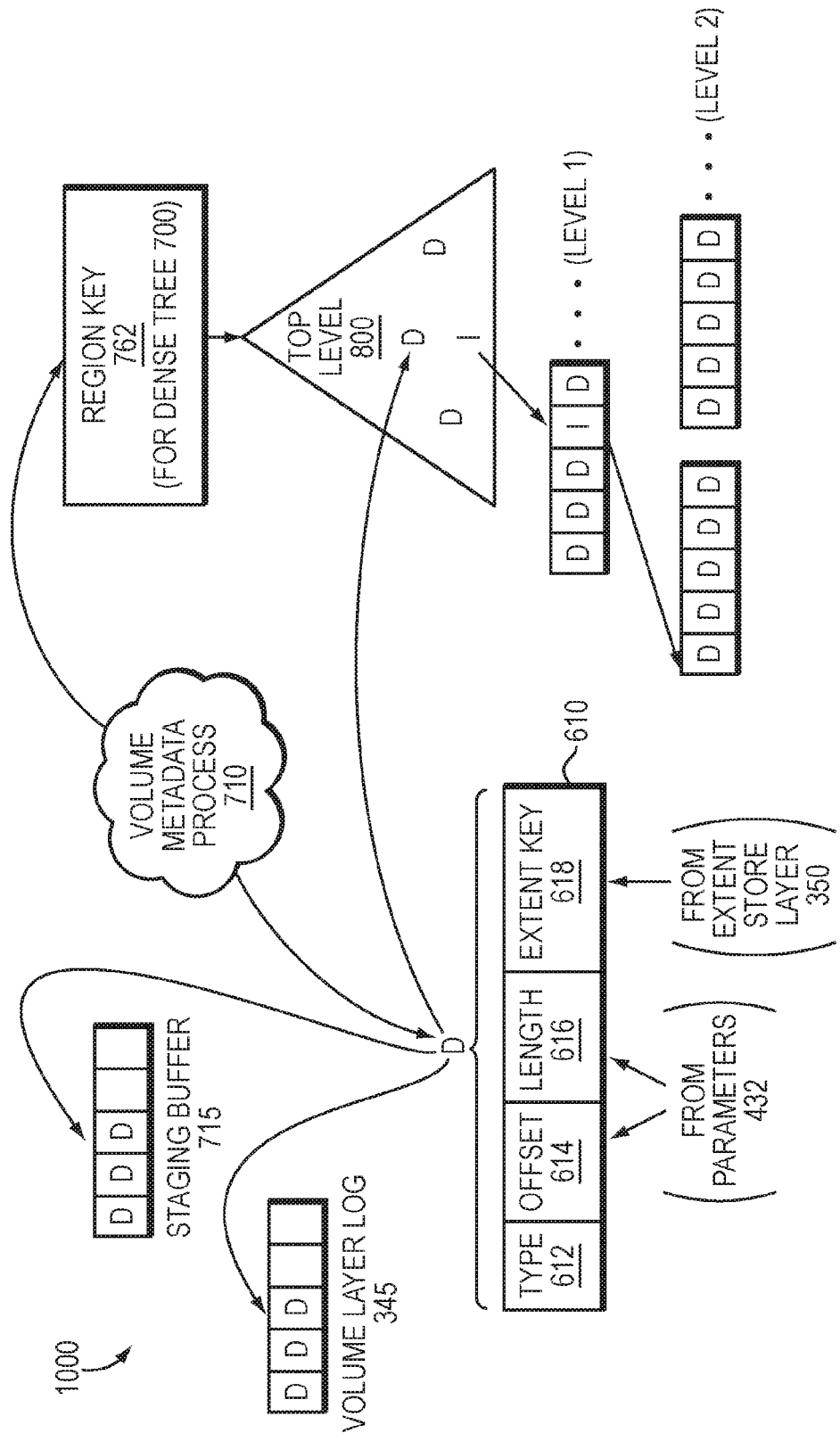
FIG. 10 illustrates a workflow for inserting a volume metadata entry into the dense tree metadata structure in accordance with a write request.

In one or more embodiments, operations for volume metadata managed by the volume layer 340 include insertion of volume metadata entries, such as data entries 610, into the dense tree 700 for write requests. As noted, each dense tree 700 may be embodied as a multiple levels of a search structure with possibly overlapping offset range entries at each level, wherein each level is a packed array of entries (e.g., sorted by offset) and where leaf entries have an LBA range (offset, length) and extent key. FIG. 10 illustrates a workflow 1000 for inserting a volume metadata entry into the dense tree metadata structure in accordance with a write request. In an embodiment, volume metadata updates (changes) to the dense tree 700 occur first at the top level of the tree, such that a complete, top-level description of the changes is maintained in memory 220. Operationally, the volume metadata process 710 applies the region key 762 to access the dense tree 700 (i.e., top level 800) of an appropriate region (e.g., LBA range 440 as determined from the parameters 432 derived from the write request 410). Upon completion of a write request, the volume metadata process 710 creates a volume metadata entry, e.g., a new data entry 610, to record a mapping of offset/length-to-extent key (i.e., LBA range-to-user data). Illustratively, the new data entry 610 includes an extent key 618 (i.e., from the extent store layer 350) associated with data (i.e., extent 470) of the write request 410, as well as offset 614 and length 616 (i.e., from the write parameters 432) and type 612 (i.e., data entry D).

The volume metadata process 710 then updates the volume metadata by inserting (adding) the data entry D into the level 0 staging buffer 715, as well as into the top level 800 of dense tree 700 and the volume layer log 345. In the case of an overwrite operation, the overwritten extent and its mapping should be deleted. The deletion process is similar to that of hole punching (un-map). When the level 0 is full, i.e., no more entries can be stored, the volume metadata entries 600 from the level 0 in-core are merged to lower levels (maintained on SSD), i.e., level 0 merges to level 1 which may then merge to level 2 and so on (e.g., a single entry added at level 0 may trigger a merger cascade). Note, any entries remaining in the staging buffer 715 after level 0 is full also may be merged to lower levels. The level 0 staging buffer is then emptied to allow space for new entries 600.

Dense Tree Volume Metadata Checkpointing

When a level of the dense tree 700 is full, volume metadata entries 600 of the level are merged with the next lower level of the dense tree. As part of the merge, new index entries 620 are created in the level to point to new lower level metadata pages 720, i.e., data entries from the level are merged (and pushed) to the lower level so that they may be "replaced" with an index reference in the level. The top level 800 (i.e., level 0) of the dense tree 700 is illustratively maintained in-core such that a merge operation to level 1 facilitates a checkpoint to SSD 260. The lower levels (i.e., levels 1 and/or 2) of the dense tree are illustratively maintained on-flash and updated (e.g., merged) as a batch operation (i.e., processing the entries of one level with those of a lower level) when the higher levels are full. The merge operation illustratively includes a sort, e.g., a 2-way merge sort operation. A parameter of the dense tree 700 is the ratio K of the size of level N−1 to the size of level N. Illustratively, the size of the array at level N is K times larger than the size of the array at level N−1, i.e., sizeof(level N)=K*sizeof(level N−1). After K merges from level N−1, level N becomes full (i.e., all entries from a new, fully-populated level N−1 are merged with level N, iterated K times.)

Figure 11:
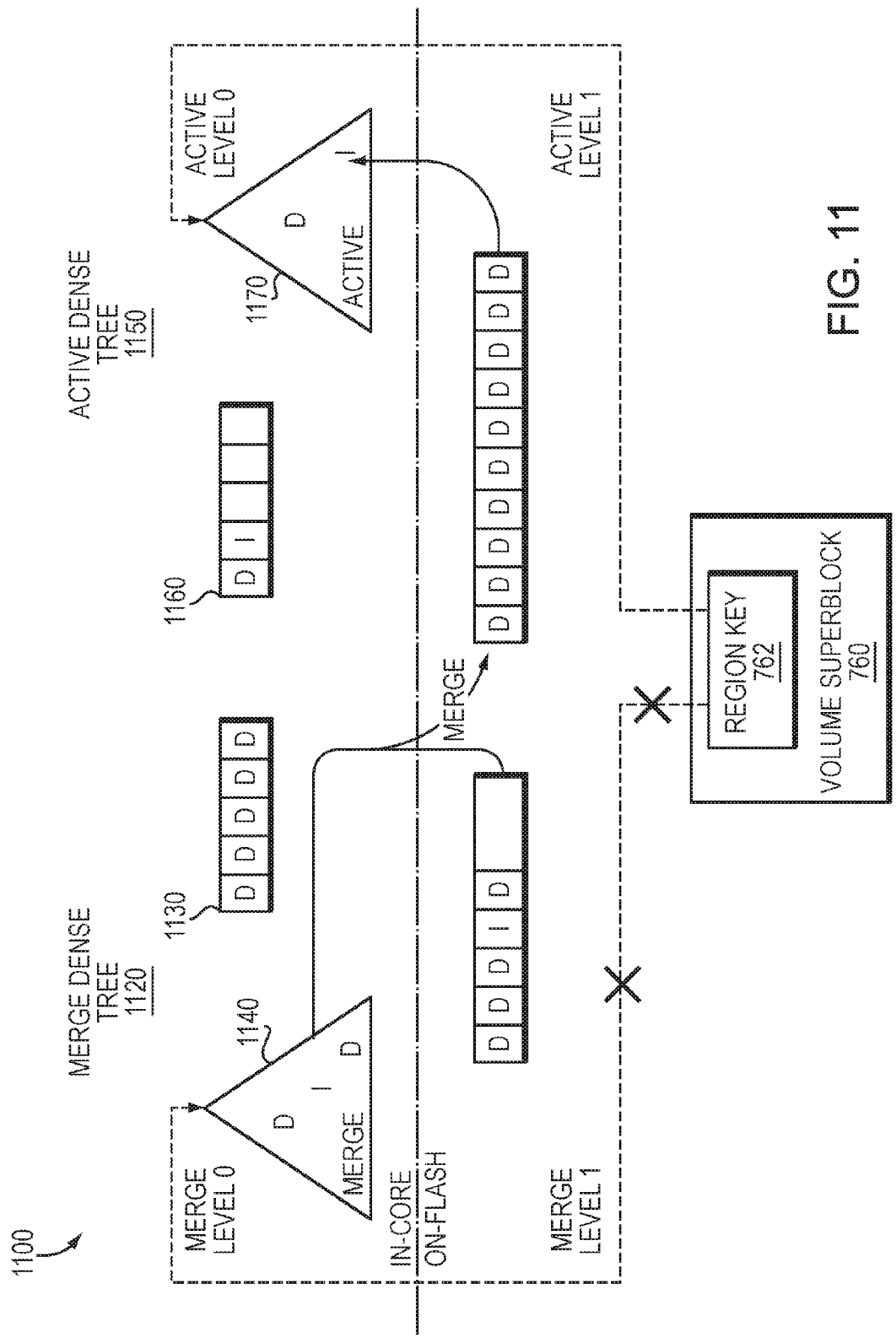
FIG. 11 illustrates merging between levels of the dense tree metadata structure.

FIG. 11 illustrates merging 1100 between levels, e.g., levels 0 and 1, of the dense tree metadata structure. In an embodiment, a merge operation is triggered when level 0 is full. When performing the merge operation, the dense tree metadata structure transitions to a "merge" dense tree structure (shown at 1120) that merges, while an alternate "active" dense tree structure (shown at 1150) is utilized to accept incoming data. Accordingly, two in-core level 0 staging buffers 1130, 1160 are illustratively maintained for concurrent merge and active (write) operations, respectively. In other words, an active staging buffer 1160 and active top level 1170 of active dense tree 1150 handle in-progress data flow (i.e, active user read and write requests), while a merge staging buffer 1130 and merge top level 1140 of merge dense tree 1120 handle consistency of the data during a merge operation. That is, a "double buffer" arrangement may be used to maintain consistency of data (i.e., entries in the level 0 of the dense tree) while processing active operations.

During the merge operation, the merge staging buffer 1130, as well as the top level 1140 and lower level array (e.g., merge level 1) are read-only and are not modified. The active staging buffer 1160 is configured to accept the incoming (user) data, i.e., the volume metadata entries received from new put operations are loaded into the active staging buffer 1160 and added to the top level 1170 of the active dense tree 1150. Illustratively, merging from level 0 to level 1 within the merge dense tree 1120 results in creation of a new active level 1 for the active dense tree 1150, i.e., the resulting merged level 1 from the merge dense tree is inserted as a new level 1 into the active dense tree. A new index entry I is computed to reference the new active level 1 and the new index entry I is loaded into the active staging buffer 1160 (as well as in the active top level 1170). Upon completion of the merge, the region key 762 of volume superblock 760 is updated to reference (point to) the root, e.g., active top level 1170 and active level 0 header (not shown), of the active dense tree 1150, thereby deleting (i.e., rendering inactive) merge level 0 and merge level 1 of the merge dense tree 1120. The merge staging buffer 1130 thus becomes an empty inactive buffer until the next merge. The merge data structures (i.e., the merge dense tree 1120 including staging buffer 1130) may be maintained in-core and "swapped" as the active data structures at the next merge (i.e., "double buffered").

Snapshot and Clones

As noted, the LUN ID and LBA (or LBA range) of an I/O request are used to identify a volume (e.g., of a LUN) to which the request is directed, as well as the volume layer (instance) that manages the volume and volume metadata associated with the LBA range. Management of the volume and volume metadata may include data management functions, such as creation of snapshots and clones, for the LUN. Illustratively, the snapshots and clones may be represented as independent volumes accessible by host 120 as LUNs, and embodied as respective read-only copies, i.e., snapshots, and read-write copies, i.e., clones, of the volume (hereinafter "parent volume") associated with the LBA range. The volume layer 340 may interact with other layers of the storage I/O stack 300, e.g., the persistence layer 330 and the SAL layer 310, to manage both administration aspects, e.g., snapshot/clone creation, of the snapshot and clone volumes, as well as the volume metadata, i.e., in-core mappings from LBAs to extent keys, for those volumes. Accordingly, the SAL layer 310, persistence layer 330, and volume layer 340 contain computer executable instructions executed by the CPU 210 to perform operations that create and manage the snapshots and clones described herein.

In one or more embodiments, the volume metadata managed by the volume layer, i.e., parent volume metadata and snapshot/clone metadata, is illustratively organized as one or more multi-level dense tree metadata structures, wherein each level of the dense tree metadata structure (dense tree) includes volume metadata entries for storing the metadata. Each snapshot/clone may be derived from a dense tree of the parent volume (parent dense tree) to thereby enable fast and efficient snapshot/clone creation in terms of time and consumption of metadata storage space. To that end, portions (e.g., levels or volume metadata entries) of the parent dense tree may be shared with the snapshot/clone to support time and space efficiency of the snapshot/clone, i.e., portions of the parent volume divergent from the snapshot/clone volume are not shared. Illustratively, the parent volume and clone may be considered "active," in that each actively processes (i.e., accepts) additional I/O requests which modify or add (user) data to the respective volume; whereas a snapshot is read-only and, thus, does not modify volume (user) data. Note that the snapshot may be embodied as an object inaccessible to the host, but still identifiable by the host, e.g., when issuing administrative commands.

Figure 12:
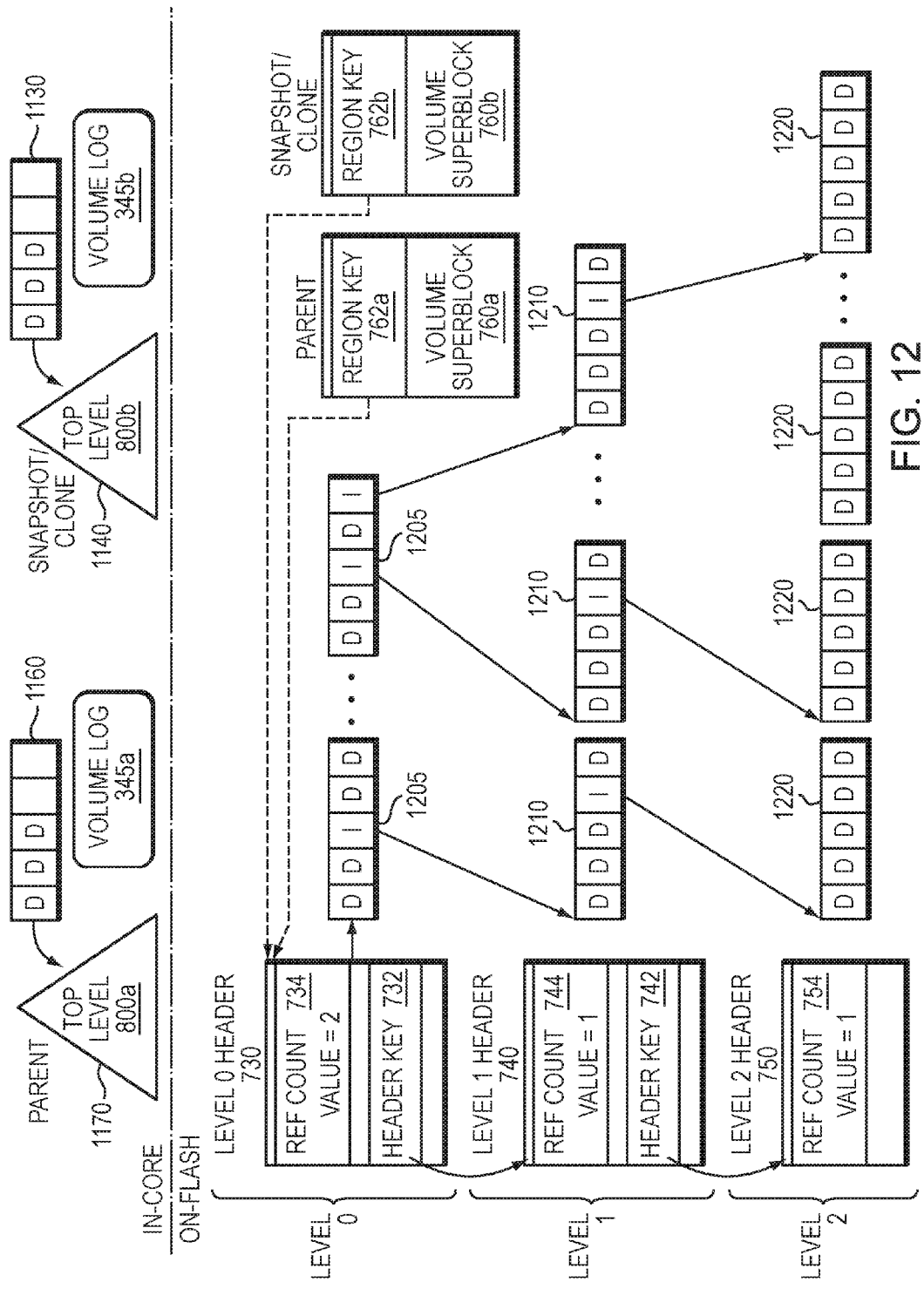
FIG. 12 is a block diagram of a dense tree metadata structure shared between a parent volume and snapshot/clone.

FIG. 12 is a block diagram of a dense tree metadata structure shared between a parent volume and a snapshot/clone. In an embodiment, creation of a snapshot/clone may include copying an in-core portion of the parent dense tree to a dense tree of the snapshot/clone (snapshot/clone dense tree). That is, the in-core level 0 staging buffer and in-core top level of the parent dense tree may be copied to create the in-core portion of the snapshot/clone dense tree, i.e., parent staging buffer 1160 may be copied to create snapshot/clone staging buffer 1130, and top level 800*a* (shown at 1170) may be copied to create snapshot/clone top level 800*b* (shown at 1140). Note that although the parent volume layer log 345*a* may be copied to create snapshot/clone volume layer log 345*b*, the volume metadata entries of the parent volume log 345*a* recorded (i.e., logged) after initiation of snapshot/clone creation may not be copied to the log 345*b*, as those entries may be directed to the parent volume and not to the snapshot/clone. Lower levels of the parent dense tree residing on SSDs may be initially shared between the parent volume and snapshot/clone. As the parent volume and snapshot/clone diverge, the levels may split to accommodate new data. That is, as new volume metadata entries are written to a level of the parent dense tree, that level is copied (i.e., split) to the snapshot/clone dense tree so that the parent dense tree may diverge from its old (now copied to the snapshot/clone) dense tree structure.

A reference counter may be maintained for each level of the dense tree, illustratively within a respective level header (reference counters 734, 744, 754) to track sharing of levels between the volumes (i.e., between the parent volume and snapshot/clone). Illustratively, the reference counter may increment when levels are shared and decremented when levels are split (e.g., copied). For example, a reference count value of 1 may indicate an unshared level (i.e., portion) between the volumes (i.e., has only one reference). In an embodiment, volume metadata entries of a dense tree do not store data, but only reference data (as extents) stored on the storage array 150 (e.g., on SSDs 260). Consequently, more than one level of a dense tree may reference the same extent (data) even when the level reference counter is 1. This may result from a split (i.e., copy) of a dense tree level brought about by creation of the snapshot/clone. Accordingly, a separate reference count is maintained for each extent in the extent store layer to track sharing of extents among volumes.

In an embodiment, the reference counter 734 for level 0 (in a level-0 header) may be incremented, illustratively from value 1 to 2, to indicate that the level 0 array contents are shared by the parent volume and snapshot/clone. Illustratively, the volume superblock of the parent volume (parent volume superblock 760*a*) and a volume superblock of the snapshot/clone (snapshot/clone volume superblock 760*b*) may be updated to point to the level-0 header, e.g., via region key 762*a,b*. Notably, the copies of the in-core data structures may be rendered in conjunction with the merge operation (described with reference to FIG. 11) such that the "merge dense tree 1120" copy of in-core data structures (e.g., the top level 1140 and staging buffer 1130) may become the in-core data structures of the snapshot/clone dense tree by not deleting (i.e., maintaining as active rather than rendering inactive) those copied in-core data structures. In addition, the snapshot/clone volume superblock 760*b* may be created by the volume layer 340 in response to an administrative operation initiated by the SAL 310. Moreover, snapshots/clones may be hierarchical, in that, a snapshot/clone may be derived from a clone that is itself derived from an original parent volume, i.e., the clone is a parent volume to its "offspring" snapshots (or clones) and the original parent volume is grandparent to the clone's "offspring."

Figure 13:
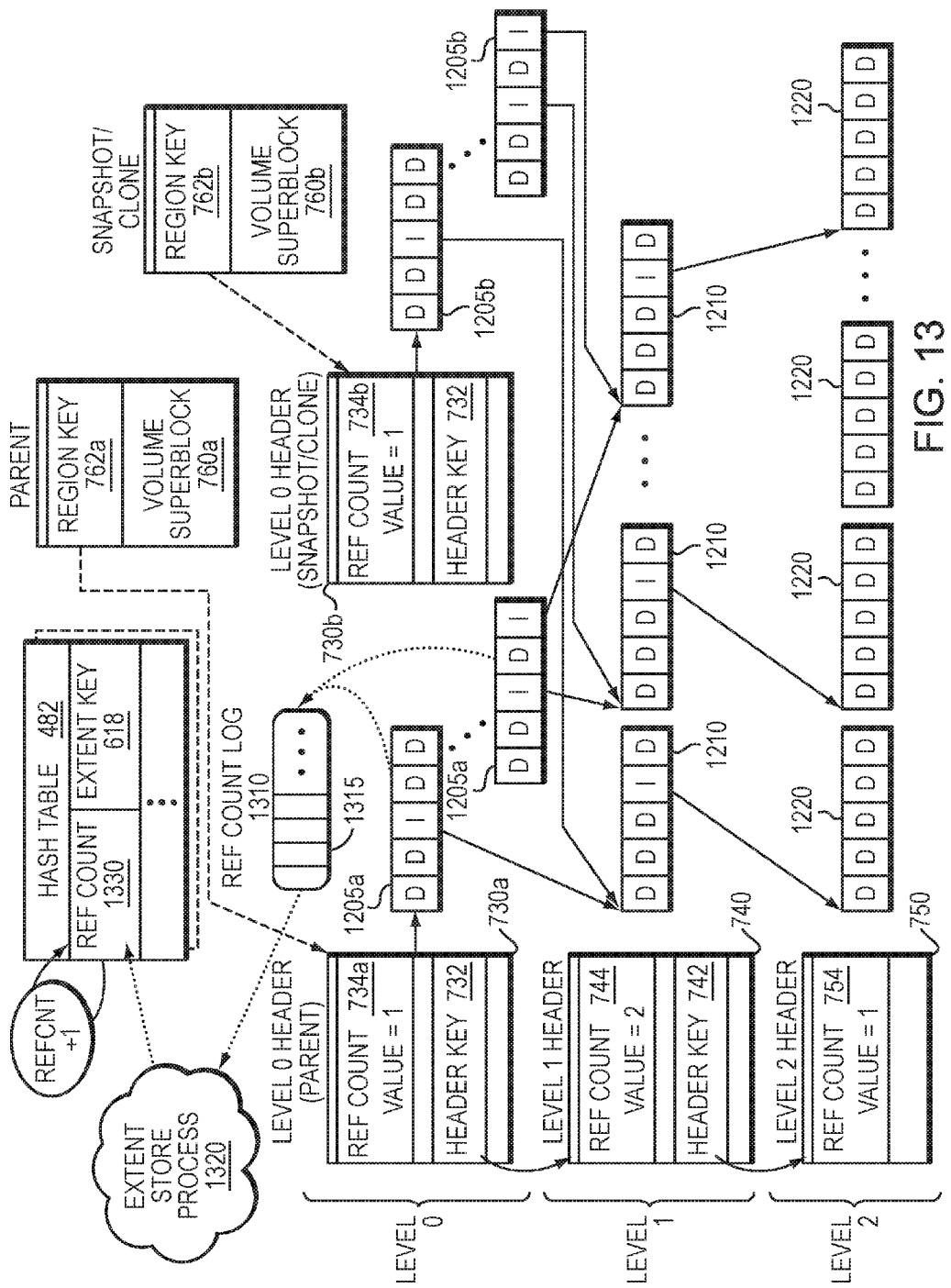
FIG. 13 illustrates diverging of the snapshot/clone from the parent volume.

Over time, the snapshot/clone may split or diverge from the parent volume when either modifies the level 0 array as a result of new I/O operations, e.g., a write request. FIG. 13 illustrates diverging of the snapshot/clone from the parent volume. In an embodiment, divergence as a result of modification to the level 0 array 1205*a* of the parent volume illustratively involves creation of a copy of the on-flash level 0 array for the snapshot/clone (array 1205*b*), as well as creation of a copy of the level 0 header 730*a* for the snapshot/clone (header 730*b*). As a result, the on-flash level 1 array 1210 becomes a shared data structure between the parent volume and snapshot/clone. Accordingly, the reference counters for the parent volume and snapshot/clone level 0 arrays may be decremented (i.e., ref count 734*a* and 734*b* of the parent volume and snapshot/clone level 0 headers 730*a*, 730*b*, respectively), because each level 0 array now has one less reference (e.g., the volume superblocks 760*a* and 760*b* each reference separate level 0 arrays 1205*a* and 1205*b*). In addition, the reference counter 744 for the shared level 1 array may be incremented (e.g., the level 1 array is referenced by the two separate level 0 arrays, 1205*a* and 1205*b*). Notably, a reference counter 754 in the header 750 for the next level, i.e., level 2, need not be incremented because no change in references from level 1 to level 2 have been made, i.e., the single level 1 array 1210 still references level 2 array 1220.

Similarly, over time, level N (e.g., levels 1 or 2) of the snapshot/clone may diverge from the parent volume when that level is modified, for example, as a result of a merge operation. In the case of level 1, a copy of the shared level 1 array may be created for the snapshot/clone such that the on-flash level 2 array becomes a shared data structure between the level 1 array of the parent volume and a level 1 array of the snapshot/clone (not shown). Reference counters 744 for the parent volume level 1 array and the snapshot/clone level 1 array (not shown) may be decremented, while the reference counter 754 for the shared level 2 array may be incremented. Note that this technique may be repeated for each dense tree level that diverges from the parent volume, i.e., a copy of the lowest (leaf) level (e.g., level 2) of the parent volume array may be created for the snapshot/clone. Note also that as long as the reference counter is greater than 1, the data contents of the array are pinned (cannot be deleted).

Nevertheless, the extents for each data entry in the parent volume and the snapshot/clone (e.g., the level 0 array 1205*a,b*) may still have two references (i.e., the parent volume and snapshot/clone) even if the reference count 734*a,b* of the level 0 header 730*a,b* is 1. That is, even though the level 0 arrays (1205*a* and 1205*b*) may have separate volume layer references (i.e., volume superblocks 760*a* and 760*b*), the underlying extents 470 may be shared and, thus, may be referenced by more than one volume (i.e., the parent volume and snapshot/clone). Note that the parent volume and snapshot/clone each reference (initially) the same extents 470 in the data entries, i.e., via extent key 618 in data entry 610, of their respective level 0 arrays 1205*a,b*. Accordingly, a reference counter associated with each extent 470 may be incremented to track multiple (volume) references to the extent, i.e., to prevent inappropriate deletion of the extent. Illustratively, a reference counter associated with each extent key 618 may be embodied as an extent store (ES) reference count (refcount) 1330 stored in an entry of an appropriate hash table 482 serviced by an extent store process 1320. Incrementing of the ES refcount 1330 for each extent key (e.g., in a data entry 610) in level 0 of the parent volume may be a long running operation, e.g., level 0 of the parent volume may contain thousands of data entries. This operation may illustratively be performed in the background through a refcount log 1310, which may be stored persistently on SSD.

Illustratively, extent keys 618 obtained from the data entries 610 of level 0 of the parent volume may be queued, i.e., recorded, by the volume metadata process 710 (i.e., the volume layer instance servicing the parent volume) on the refcount log 1310 as entries 1315. Extent store process 1320 (i.e., the extent store layer instance servicing the extents) may receive each entry 1315 and increment the refcount 1330 of the hash table entry containing the appropriate the extent key. That is, the extent store process/instance 1320 may index (e.g., search using the extent metadata selection technique 480) the hash tables 482*a-n* to find an entry having the extent key in the ref count log entry 1315. Once the hash table entry is found, the refcount 1330 of that entry may be incremented (e.g., refcnt+1). Notably, the extent store instance may process the ref count log entries 1315 at a different priority (i.e., higher or lower) than "put" and "get" operations from user I/O requests directed to that instance.

Snapshot Creation Workflow

A snapshot creation workflow enables efficient creation of one or more snapshots for a group of LUNs organized as a consistency group (CG) (i.e., a set of LUNs having collectively applied management operations) and served by storage I/O stacks executing on a plurality of nodes of the cluster. A plurality of indivisible operations (i.e., transactions) of a snapshot creation workflow is administered by the SAL (e.g., included in the administration layer 310) of the storage I/O stack in response to a snapshot create request issued by a host. The SAL administers the snapshot creation workflow by initiating a set of transactions that includes, inter alia, (i) installation of barriers for LUNs (volumes) across all nodes in the cluster that participate in snapshot creation, (ii) creation of point-in-time (PIT) markers to record those I/O requests that are included in the snapshot, and (iii) updating of records (entries) in snapshot and volume tables of the cluster database (CDB) 244.

Illustratively, a CG allows a set of LUNS to be grouped together, so that management operations may be applied to the group collectively. That is, operations such as creating snapshots, restoring snapshots, and replication operate on the CG group as a whole. Further, such operations may be synchronized such that a snapshot taken for a CG ensures that write order dependencies are preserved across the set of LUNs in the CG by making sure that the snapshot is crash consistent and approximately contemporaneous across the set of LUNs.

A snapshot, e.g., a "top level snapshot", may be a LUN snapshot or a CG snapshot. To create a crash consistent image for the CG and to ensure fast and efficient creation of the snapshot, as well as recovery of the snapshot from a crash, the technique provides a snapshot creation workflow. The SAL administers the snapshot creation workflow by initiating a set of operations or transactions that includes, inter alia, (i) creation of records (entries) in snapshot and volume tables of the CDB, (ii) creation of barriers for LUNs (volumes) across all nodes in the cluster that participate in snapshot creation, (iii) creation of point-in-time (PIT) markers to record those I/O requests that are included in the snapshot, and (iv) updating of the records in the snapshot and volume tables of the CDB. In an embodiment, the volume table of the CDB stores details (e.g., volume UUID), of all volumes (i.e., LUNs) in the cluster and the snapshot table of the CDB stores details (e.g., snapshot name, snapshot ID) of all snapshots serviced by the cluster.

Installation of a barrier for each LUN of, e.g., a single volume or set of volumes in the CG, is illustratively performed in accordance with the workflow using a 2-phase transaction protocol. A barrier set message is issued by the SAL to the persistence layer to set a barrier flag for each LUN in an in-memory volume structure, wherein setting of the flag manifests establishment of a barrier delimiting I/O requests (i.e., I/O requests received before establishment of the barrier are permitted on the LUN). The persistence layer illustratively records and maintains the barrier in-memory (in-core) using a sequence number of a write request beyond which no further write requests are allowed to proceed. In an alternative embodiment, the persistence layer may persistently record the barrier in, e.g., NVLOG. Each node in the cluster may install the barrier during the transaction (i.e., barrier set message). An acknowledgement is then returned to the SAL to complete the barrier installation Installation of a barrier in the persistence layer ensures that from the point of installation, all new (i.e., later than establishment of the barrier) I/O (write) requests directed to the LUN are blocked (queued) at the persistence layer. In an embodiment, the persistence layer may process the I/O requests, log the requests in the NVLOG and load the requests into the write-back cache 380 (e.g., queued in a log). However, the barrier prevents the queued I/O requests from being forwarded to the volume layer. Setting of barriers on all LUNs of the CG also ensures that no replies (acknowledgements) to write requests are returned to the host beyond the point of the barrier so as to prevent any subsequent write data from being included in a snapshot on one of the volumes (LUNs) of the CG and not on the other volumes of the CG. In other word, barriers are installed on all volumes of the CG to ensure creation of a consistent snapshot by, e.g., preventing acknowledgement of the I/O (write) requests to the host, which would allow the host to proceed to issue additional I/O requests. Thus, the barriers effectively delimit the I/O requests to a volume (LUN) that are blocked in the persistence layer to prevent acknowledgements back to the host that the writes are completed. If any node in the cluster servicing the LUN (i.e., the LUN being snapshotted) fails to install the barrier, the transaction is rejected (i.e., the barrier set message) and an error may be returned to the host in response to the snapshot create request. Illustratively, a discard phase of the protocol removes the barrier in the event of rejection or failure (e.g., crash).

The snapshot creation workflow also includes creation and recordation of the PIT marker using a PIT transaction for each LUN of, e.g., the single volume or set of volumes in the CG using a 2-phase transaction protocol. Upon validating that each node installed the barrier for each LUN, the persistence layer creates and records the respective PIT marker for each LUN using, e.g., a sequence number of the PIT transaction, a snapshot ID (UUID) and a volume UUID for each service in the persistence layer. In an embodiment, the persistence layer records and maintains the PIT marker in core (in memory), although in an alternative embodiment, the persistence layer may persistently record the PIT marker in, e.g., NVLOG. Illustratively, only one in-flight snapshot operation is performed at a time such that there is only one PIT marker per volume until the snapshot creation workflow is complete. However, in an alternate embodiment, multiple in-flight snapshot operations using multiple PIT markers may be performed per volume, wherein the multiple PIT markers are maintained and recorded as described herein. If recording of the PIT is successful for each LUN, a commit point of the snapshot creation workflow may be realized wherein the transaction commits. Once the PIT is recorded by the persistence layer, the barrier(s) may be removed and SAL may reply to the host that the snapshot is completed (while other operations described herein occur in the background). Once recorded in NVLog, the PIT is persistently (and safely) stored such that if a crash occurs, the queued write requests included up to the PIT marker may be replayed to ensure a consistent state from the perspective of the host.

The persistence layer may then forward (flush) all the queued write requests up to (but not beyond) the PIT marker associated with the volume to the volume layer. Notably, there may be multiple streams within the volume that flush the write requests to the volume layer. In addition, barrier semantics are maintained by the persistence layer with respect to I/O requests such that (i) a write request initially arriving at the cluster prior to the PIT, but not finishing arrival until after the PIT, is queued and not sent to the volume layer (i.e., write requests crossing the sequence number of the PIT); and (ii) write requests are not coalesced such that they straddle the PIT sequence number (i.e., a first write request arriving before the PIT is not combined with a second write request arriving after the PIT).

In an embodiment, when each stream encounters the PIT marker, a service process (service) in the persistence layer sends a snapshot create message to a corresponding service of the volume layer. The service of the persistence layer may send the snapshot create message to a corresponding service of the volume layer upon receiving a reply from the volume layer for all I/O requests received up to the PIT. That is, the persistence layer waits for I/O requests that are deemed part of the snapshot (i.e., arriving before the PIT) to be acknowledged by the volume layer prior to issuing the snapshot create message.

In response to the snapshot create message, the corresponding service of the volume layer creates a snapshot by, e.g., sharing level 0 of the source volume dense tree with the snapshot dense tree as described previously. As noted, creation of the snapshot is further manifested by incrementing the reference count in the level headers (e.g., level 0 header) of the dense tree and updating of the superblock. In an embodiment, the persistence layer also logs a snapshot create done record to the NVLog, e.g., to ensure that replay ignores all write requests up to the PIT for the volume. The persistence layer may then start sending write requests that follow (i.e., later than) the PIT sequence number in subsequent flushes. Illustratively, the done records carry sufficient information (such as, e.g., the UUID of the snapshot volume) to indicate which snapshot volume is complete. The volume layer then sends a message to the SAL when snapshot creation has completed for all of the services. Once the snapshot is created, the persistence layer may resume forwarding writes beyond the PIT to the volume layer.

Upon receiving the message from the volume layer, the SAL updates two tables of the CDB at the same time, i.e., the volume table and the LUN (snapshot) table. Illustratively, SAL marks the snapshot volume state to "ONLINE" in the CDB volume table. In addition, the snapshot for the LUN is marked as "CREATED" in the CDB snapshot table. Once the snapshot for all the snapshot volumes in the CG are created, the SAL marks the CG snapshot as "CREATED" in the CDB snapshot table. The snapshot is then considered online and may be accessed.

Figure 14:
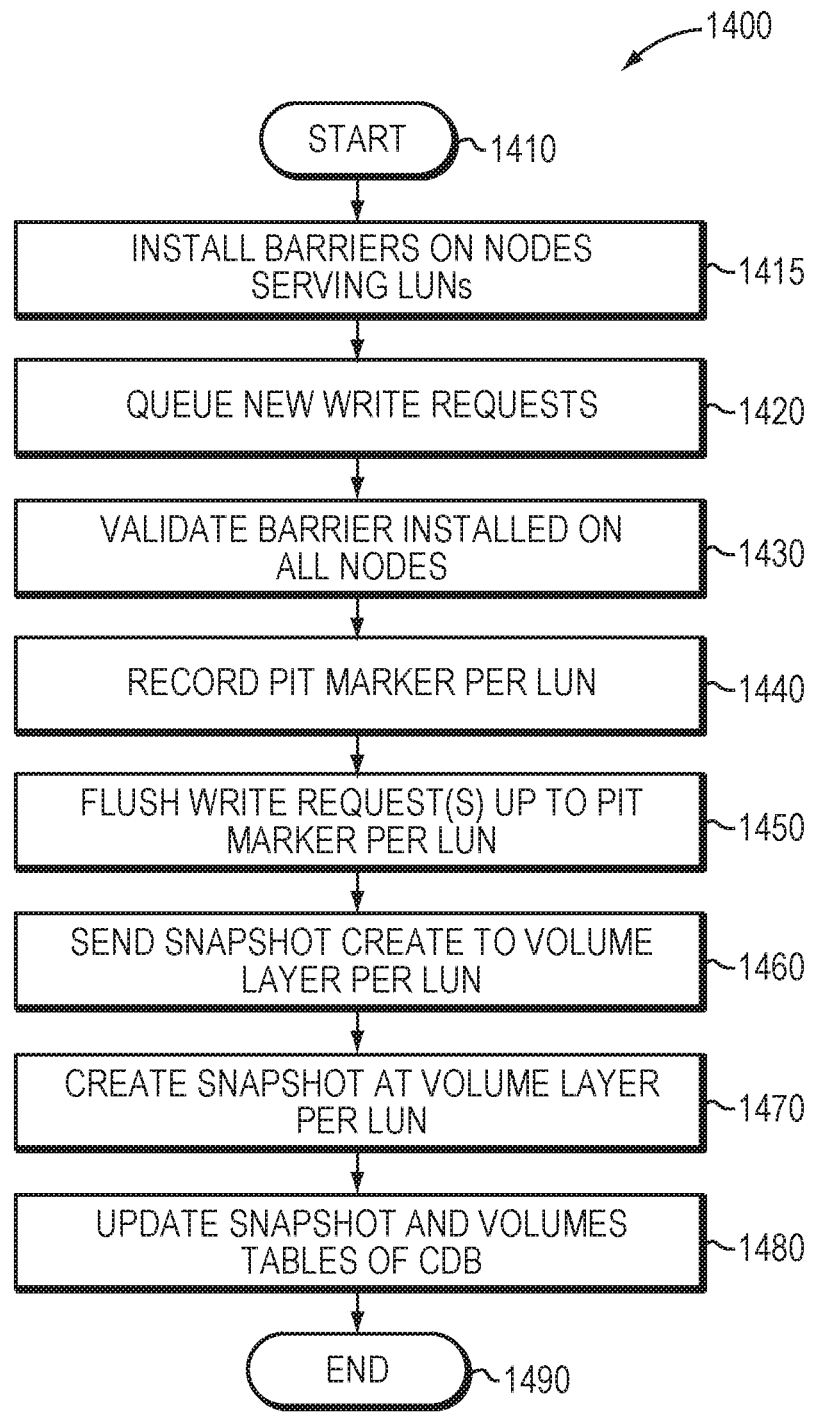
FIG. 14 is a flowchart illustrating a snapshot create workflow procedure directed to creation of a snapshot for a group of LUNs organized as a consistency group.

FIG. 14 is a flowchart illustrating a snapshot create workflow procedure directed to creation of a snapshot for a group of LUNs organized as a CG. SAL manages all operations of the workflow in parallel to preserve write order dependencies across the LUNs of the CG, thereby ensuring that the snapshot is crash consistent across the LUNs. To that end, the procedure 1400 starts at step 1410 and proceeds to step 1415 where barriers are installed on all nodes of the cluster having LUNs (volumes) of the CG. At step 1420, new write requests are queued at the persistence layer of each node to ensure that a snapshot of the CG is consistent across all volumes. At step 1430, the persistence layer validates that the barriers are installed on all of the nodes. At step 1440, the persistence layer records a PIT marker for each LUN of the CG and, at step 1450, flushes the queued write requests up to the PIT marker as streams to the volume layer. At step 1460, services of the persistence layer send snapshot create messages to corresponding services of the volume layer. The volume layer creates the snapshots of the CG at step 1470 and, at step 1480, SAL updates the tables of the CDB to indicate that the snapshots are rendered online and accessible. The procedure the ends at step 1490. An exemplary embodiment of a snapshot creation workflow is described in commonly owned U.S. patent application Ser. No. 14/869,340 titled Snapshot Creation Workflow by Zheng et al., filed on Sep. 29, 2015.

Snapshot Restore

A snapshot restore (snap restore) technique enables efficiently restoration of snapshots of storage containers served by the storage I/O stack executing on one or more nodes of a cluster. The SAL interacts with a volume layer of the storage I/O stack to manage and implement a snap restore procedure to restore one or more snapshots of a storage container. The storage container may be a logical unit (LUN) embodied as parent volume (active volume) and the snapshot may be represented as an independent volume embodied as read-only copy of the active volume. The snap restore procedure may be configured to allow restoration (roll back) of a LUN from a single snapshot or restoration of a plurality of LUNs organized as a CG from a group of respective snapshots. As described herein, a consistency group is a set (i.e., collection) of objects, e.g., LUNs or other CGs (nested CG), which may be operated upon collectively by an administrative command via the SAL. Illustratively, restoration of the LUN from a snapshot involves (i) creation of another independent volume embodied as a read-write copy (clone) of the snapshot, (ii) replacement of the (old) active volume with the clone, (iii) deletion of the old active volume, and (iv) mapping of the LUN to the clone (i.e., a new active volume).

In response to a command from a host (administrator) to snap restore a LUN or group of LUNs (i.e., a CG), the SAL issues clone create, clone update, and volume delete messages to the volume layer to create clone(s) of the snapshot(s) of the LUN(s) and then replace (swap) the old active volume(s) of the LUN(s) with the clone(s). Cloning of the snapshot is illustratively performed at the volume layer of the node that owns the volume using the same mechanism for cloning a parent volume as described herein. Once the clone is created, all nodes of the cluster are notified of the created clone and, in particular, of a new volume identifier (ID) of the clone that underlies the LUN. In an embodiment, replacement of each old active volume with a clone is performed in accordance with a distributed CDB procedure that updates attributes of the clone to reflect the attributes of the LUN at a time of the snapshot including (i) size of the LUN at the time of the snapshot, (ii) administrative comment, (iii) block size, (iv) name of the LUN at the time of the snapshot, and (v) consistency group membership. The attributes at the time of the snapshot are saved in the CDB as part of a snapshot record for each LUN. Notably, a host-visible serial number of the LUN is not updated (restored) so as to avoid changing the identity of the LUN and to prevent disruption to a host operating system. In addition, each SCSI target is updated with the new volume ID, e.g., a universally unique identifier (UUID), of the clone so that I/O requests may be directed to the clone. All nodes of the cluster are then notified to update SCSI target(s) related to the LUN with those attributes from the time of the snapshot(s), i.e., attributes of the clone(s).

In an embodiment, the distributed CDB update procedure is performed according to a 2-phase transaction model, where each node prepares to update the SCSI target(s), i.e., LUN(s), with the attributes of the clone(s) and, if the preparation is successful, commits the attributes and redirects I/O requests from the old active volume(s) to new active volume(s) embodying the clone(s) as an atomic operation. As part of the distributed CDB update procedure, each old active volume is deleted. Thus, the 2-phase transaction includes (i) preparing to modify attributes of the LUN and to delete the old active volume, and (ii) pushing the modification and deletion as one atomic operation into SCSI targets across all the nodes. If the atomic update is not successful, (i.e., an error arises during the atomic update), the clone (i.e., restored snapshot) is deleted, the SCSI target(s) are not modified with the new attributes, and the user (host) is notified, e.g., via the SAL, of an error. However, if the atomic update is successful, the volume layer acknowledges creation and update of the clone, as well as deletion of the old active volume, to the SAL. Note that the snap restore command applied to a consistency group operates individually on each LUN of the group, i.e., each LUN may be restored from a different snapshot or a same snapshot, to effect the command collectively. Note also that the individual operations of the consistency group may execute concurrently in storage I/O stack.

Figure 15:
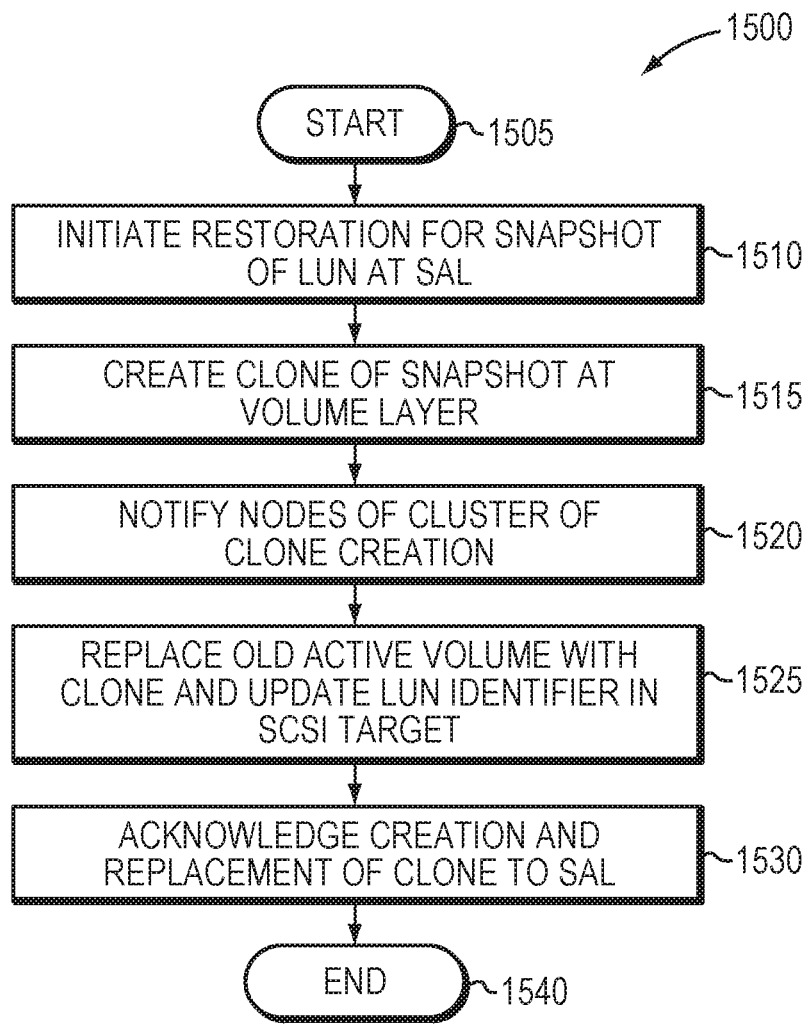
FIG. 15 illustrates a procedure for restoring a snapshot.

FIG. 15 illustrates a procedure for restoring a snapshot. The procedure 1500 starts at step 1505 and proceeds to step 1510 where, in response to receiving a snapshot restore command from an administrator, the SAL initiates restoration of the snapshot of a LUN by sending clone create, clone update and volume delete messages to the volume layer. Upon acknowledging receipt of the messages, the volume layer creates the clone (as described herein) of the snapshot at step 1515 and, at step 1520, all nodes of the cluster are notified of the created clone. At step 1525, the nodes replace the old active volume with the clone in accordance with the distributed CDB procedure that updates attributes of the clone, including the new volume ID of the clone, to reflect the attributes of the LUN at a time of the snapshot and that deletes the old active volume as an atomic operation. At step 1530, the volume layer acknowledges creation and replacement (i.e., update of the clone as well as deletion of the old active volume) of the clone to the SAL. In an embodiment, the acknowledgment contains the old active volume UUID, as well as the clone UUID. The snapshot restore procedure then ends at step 1540. An exemplary embodiment of a snapshot restore technique is described in commonly owned U.S. patent application Ser. No. 14/815,064 titled Snapshot Restore Workflow by Bolen et el., filed on Jul. 31, 2015.

Data Replication

Figure 16:
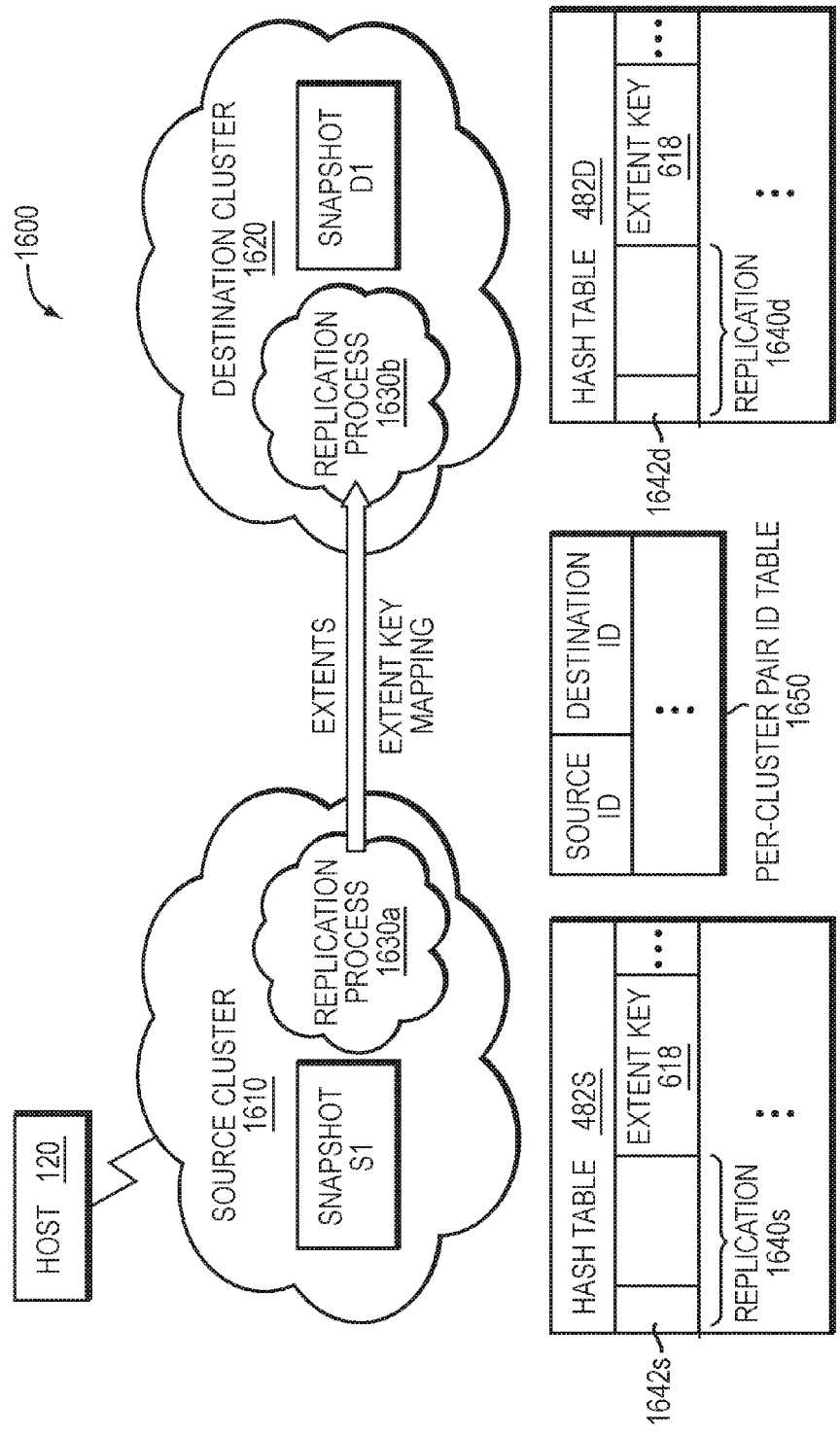
FIG. 16 is a block diagram of a technique for efficient replication between a source cluster and a destination cluster of a clustered network.

FIG. 16 is a block diagram of a technique for efficient replication between a source cluster 1610 (i.e., a first cluster 100) and a destination cluster 1620 (i.e., a second cluster 100) of a clustered network 1600. Data replication in the clustered network 1600 may be performed by the replication layer 315, which leverages global in-line deduplication of the clusters to identify and avoid copying duplicate data from the source cluster (source) to the destination cluster (destination). To ensure that the copy of the data on the destination is synchronized with the data received at the source, the replication layer 315 of the source may create a snapshot 51 of the data that is copied to the destination for use as a baseline snapshot D1 at the destination. Thereafter, new data received at the source that differs from the baseline snapshot 51 are transmitted and copied to the destination.

The new data may be data associated with one or more write requests (i.e., write data) issued by a host and directed to a LBA range of a LUN served by the source and associated with the snapshot 51. The write data may be organized, e.g., aggregated, into one or more extents, which may be de-duplicated in-line. A hash function may be applied to each extent to generate an extent key that is stored in an ES hash table of each cluster. The extent key is configured to reference a location of the extent on one or more storage devices, such as SSDs 260 of the cluster. As such, replication illustratively occurs between two different extent stores on different (e.g., source and destination) clusters, each using the same extent keys, i.e., a same hash function is used on both clusters. Note that the hash function on each cluster may employ a same hash algorithm, but with different parameters (e.g., a different salt) or a different hash algorithm; in both cases the hash space between the source and destination differs such that duplicates may not be avoided (i.e., the same extent key may map to different extents in the source cluster than in the destination cluster).

To preserve efficiency during data replication, a replication process 1630*a,b* at each node (i.e., source and destination) of each cluster 1610, 1620 negotiate (e.g., during an initialization stage of replication) to ensure that the same hash function is used by the source and destination. In addition, the replication processes 1630*a,b* of the source and destination nodes negotiate to establish a mapping of name-to-data when transferring data (i.e., an extent) between the clusters. Illustratively, the name is the extent key for the extent, such that the negotiated mapping established by the source and destination is based on the extent key associated with the extent. To avoid name collisions, the source (i.e., replication process 1630*a*) sends the extent along with the extent key (i.e., name) to the destination (i.e., replication process 1630*b*) for the first transfer of new data to verify the association (i.e., mapping) of the key to the extent. The destination (i.e., replication process 1430*b*) accepts the mapping if it can use the extent key-to-extent association (i.e., as a new mapping or as a duplicate of an existing mapping). The mapping may be considered valid and in effect when the source and destination agree on the association, and may be considered invalid when, e.g., the extent is deleted either by the source or destination. The extent is considered duplicate when there is an existing mapping associated with the extent key of the extent.

In an embodiment, a replication field 1640 is provided within each entry of the ES hash table 482, wherein the replication field is associated with an extent of the respective entry. The replication field is illustratively associated on a per-cluster pair, e.g., between the source and destination clusters, and includes one or more replication bits 1642 organized as a bit plane, e.g., one byte (8 bits) per entry of the ES hash table, wherein each bit represents a per-cluster pair replication relationship, e.g., up to 8 replication relationships may be represented using a one byte replication field. Illustratively, each replication bit 1642*s* of the bit plane on the source is thus linked to a particular destination cluster, which may be indicated using an associated cluster identifier, e.g., a first replication bit may correspond to destination cluster identifier (ID) X and a second bit may correspond to destination cluster ID Y. That is, the first replication bit represents a "Source-X" per-cluster pair replication relationship, whereas the second replication bit represents a "Source-Y" per-cluster pair replication relationship. To that end, a per-cluster pair ID table 1650 may be maintained in each cluster 1610, 1620 to identify source and destination clusters.

In an embodiment, a mapping of extent key to extent may be established when the source sends the extent key along with the extent to the destination, and the destination stores the extent with the same extent key or already has the same extent stored under the same key. In response, the source and destination may assert (e.g., set) their replication bits (e.g., to 1) 1642*s,d* in their respective replication fields 1640*s,d* of the ES hash table entries for the corresponding extent key 618. Notably, assertion of corresponding replication bits at the source and destination indicates that any further extents associated with the extent key may be considered duplicate. Each replication bit may be (implicitly) unasserted (e.g., cleared) when either the source or destination deletes the extent and the extent key, such that the ES entry for the key does not exist. Accordingly, if either the source or the destination deletes the extent, the associated extent key and corresponding replication bit are implicitly cleared, since the ES hash table entry for the extent key no longer exists, i.e., the key is removed from the entry. Once the replication bits are cleared, the extent key (and ES hash table entry) can be reused for the same or different extent. An exemplary embodiment of a data replication technique is described in commonly owned U.S. patent application Ser. No. 14/876,460 titled Technique for Preserving Efficiency for Replication between Clusters of A Network by Zheng et al., filed on Oct. 6, 2015.

Consistency Group Management

The embodiments herein are directed to use of a consistency group as a basic unit of data management of storage containers served by the storage I/O stack executing on one or more nodes (i.e., storage systems) of the cluster. The storage container may be a LUN embodied as parent volume (active volume), a snapshot (represented as an independent volume embodied as read-only copy of the active volume), and a clone (represented as another independent volume embodied as a read-write copy (clone) of the active volume). As used herein, a consistency group (CG) is a set (i.e., collection) of objects, e.g., LUNs or other CGs (nested CG), which may be managed and operated upon collectively by an administrative command via SAL. The CG and LUN share a hierarchical namespace across the cluster of storage systems, i.e., CGs and LUNs may not have the same hierarchical name. Snapshots also share the cluster-wide hierarchical namespace, such that each snapshot has a cluster-wide unique hierarchical name. The SAL may interact with one or more layers of the storage I/O stack to (i) create a clone of a set of object members of the CG; (ii) create one or more snapshots of the set of object members of the CG; (iii) restore the set of object members of the CG from a group of CG snapshots; (iv) replicate the set of object members of the CG as a single entity; and (v) delete a CG and a nested CG according to specific semantics.

Illustratively, the administrative command operating collectively on a first set of objects succeeds (e.g., a success code may be returned) when the command succeeds for each member of that first set of objects to create the consistency group. A second set of objects having members that result from processing the administrative command on corresponding members of the first set of objects yields the consistency group. In response to a failure of the processing (i.e., unsuccessful completion) of the administrative command on one or more members of the first set of objects, all members of the second set of objects are deleted (or rolled-back) and the administrative command to create the consistency group returns with an unsuccessful return code.

Figure 17:
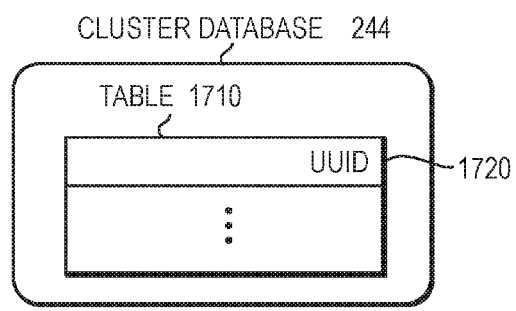
FIG. 17 is a block diagram of the consistency group represented in a cluster database.

FIG. 17 is a block diagram of a CG as represented in the cluster database. In an embodiment, each CG and LUN is represented as a row entry 1720 in one or more tables 1710 of the CDB 244 and is identified by (e.g., associated with) a UUID. Each LUN and CG may have a parent CG object, which may be a null (without data) object (NULL). Each CG may have a list of children which can be any combination of LUNs and/or CGs. Therefore, an unbounded hierarchy of objects of a CG may be constructed, wherein a name of an object in the hierarchy may be derived by concatenating a parent name of the object with a component name of the object to yield a name in the hierarchical namespace. For example, assume LUN1 is a child of /CG1/CG2, then its name is /CG1/CG2/LUN1. This naming convention is repeated recursively and, since an object may only have one parent, guarantees name uniqueness of all objects even if component names are not unique. For instance, LUN1 may be a non-unique component name as long as the full pathname is unique, such as /CG1/LUN1 and /CG1/CG2/LUN1 which are two different and uniquely named LUN objects.

Figure 18A:
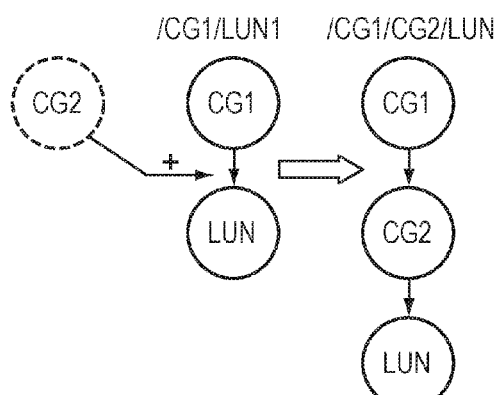
FIGS. 18a,b illustrate policy rules for creating the consistency group.
Figure 18B:
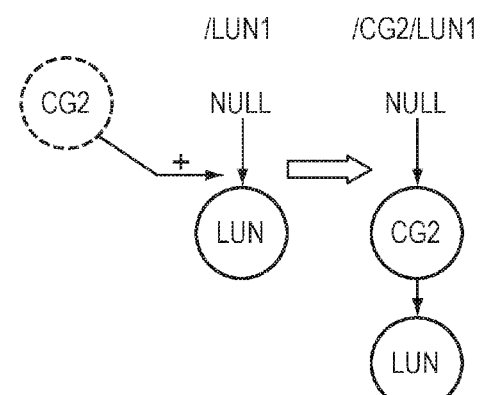
Figure 19A:
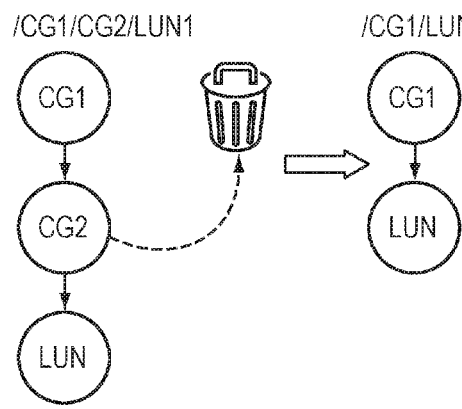
FIGS. 19a,b illustrate policy rules for deleting the consistency group.
Figure 19B:
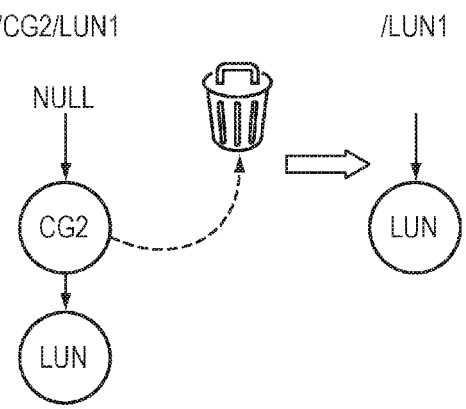

FIGS. 18a,b and FIGS. 19a,b illustrate policy rules for creating and deleting a CG. Illustratively, object membership in a CG adheres to a policy having the following rules: (1) LUNs or CGs may be created and deleted within a CG at any time; (2) an existing LUN or CG may not be added to or removed from an existing CG except (i) when creating a new CG, wherein the new CG may become a new parent of the existing CG/LUN if both a current parent of the existing CG/LUN and the parent of the new CG are the same CG or NULL (i.e., the new CG is inserted into the hierarchy becoming parent to the existing CG, but a child of current parent of the existing CG) as illustrated in FIGS. 18 a,b; and (ii) when deleting the existing CG, wherein the for the resulting hierarchy the parent of the existing CG/LUN is either the parent of the parent CG (i.e., the grandparent of the existing CG/LUN becomes the parent) or NULL if no such parent CG exists as illustrated in FIGS. 19a,b; and (3) a CG may not be deleted unless all of its snapshots are deleted.

CGs and LUNs are managed as proper objects according to the above policy rules with operations (such as rename, snapshot create and restore, and clone create) allowed on the objects. Notably, a delete operation may be permitted with the semantic that child objects are "promoted" upward instead of being destroyed, i.e., delete /CG1/CG2 for hierarchy /CG1/CG2/LUN results in /CG1/LUN so that the child "LUN" is promoted to become a child of CG1 rather than destroyed.

In an embodiment, snapshots and clones may be created on a per object basis. Creation of a clone of a CG results in a new CG plus a new LUN for each object member of the CG, while creation of a snapshot of a CG results in a single snapshot copy that includes all object members of the CG. Snapshots or clones may be created for an object member of the CG independently of the parent CG. Moreover, different object members of the CG may have different snapshot creation times and retention policies from the CG itself.

Restoration of a snapshot (snap restore) may be performed from any CG snapshot, including an object of the CG. For example, snap restore of a LUN of the CG restores the LUN to a same state as exists in the CG snapshot. In addition, snap restore of a CG from the group of CG snapshots restores the CG to a same state as exists in the CG snapshot, including the same membership and state of all object members. Object members in a current CG but not in the snapshots may be deleted as a result of the snap restore. If the snap restore introduces an inconsistency in an object or parent object of a CG, a user may be warned of the impact of such inconsistency. For instance, restoring a snapshot for an object member of the CG, but not the entire CG, may render the CG inconsistent.

Replication may be performed on a per object basis. Creation of a replication of a LUN results in a LUN replica, while replication of a CG results in a CG replica that includes a LUN replica for each original LUN member of the CG. Restoration of the CG replica results in a restored CG. In an embodiment, replication of the CG from a source cluster occurs by creating a snapshot of the CG and then for each snapshot member of the CG (i.e., for each object of the snapshot of the CG), read the data from the respective snapshot member and send that data to a destination cluster.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving an administrative command directed to a first set of storage containers to create a first consistency group served by a storage system having a storage array of storage devices configured to store the storage containers;
processing the administrative command for each member of the first set of storage containers to create the first consistency group having a second set of storage containers, wherein each member of the second set of storage containers is created as a result of the processing of the administrative command on a corresponding member of the first set of storage containers, wherein each member of the first set of storage containers is a first child object of the first consistency group in a hierarchical namespace of the storage system;
determining whether the processing of the administrative command for a member of the first set of storage containers completes unsuccessfully; and
in response to determining that the processing of the administrative command for the member of the first set of storage containers completes unsuccessfully, deleting all members of the second set of storage containers and returning an unsuccessful completion to the received administrative command to create the first consistency group.

2. The method of claim 1 wherein the administrative command is selected from a group consisting of a command to create a snapshot of a storage container and a command to create a clone of the storage container.

3. The method of claim 2 wherein the first set of storage containers includes logical units.

4. The method of claim 2 wherein the first set of storage containers includes a second consistency group having a third set of storage containers.

5. The method of claim 1 wherein each member of the second set of storage containers is associated with a universally unique identifier stored in a database of the storage system.

6. The method of claim 4 wherein the second consistency group is a second child object of the first consistency group in the hierarchical namespace of the storage system, and wherein the second consistency group is destroyable without deleting the third set of storage containers.

7. The method of claim 1 wherein a pathname in the hierarchical namespace for each first child object of the first consistency group is unique within the namespace.

8. The method of claim 6 further comprising:
destroying the second consistency group such that the first consistency group becomes a parent of the third set of storage containers.

9. The method of claim 1 wherein a first member and a second member of the second set of storage containers are snapshots having a different creation time from the first consistency group.

10. A system comprising
a storage system connected to a processor; and
a storage I/O stack executing on the processor of the storage system, the storage I/O stack configured to:
receive an administrative command directed to a first set of storage containers to create a first consistency group served by the storage system;
process the administrative command for each member of the first set of storage containers to create the first consistency group having a second set of storage containers, wherein each member of the second set of storage containers is created as a result of the processing of the administrative command on a corresponding member of the first set of storage containers, wherein each member of the first set of storage containers is a first child object of the first consistency group in a hierarchical namespace of the storage system;
determine whether the processing of the administrative command for a member of the first set of storage containers completes unsuccessfully; and
in response to determining that the processing of the administrative command for the member of the first set of storage containers completes unsuccessfully, delete all members of the second set of storage containers and return an unsuccessful completion to the received administrative command to create the first consistency group.

11. The system of claim 10 wherein the administrative command is selected from a group consisting of a command to create a snapshot of a storage container and a command to create a clone of the storage container.

12. The system of claim 11 wherein the first set of storage containers include logical units.

13. The system of claim 11 wherein the first set of storage containers includes a second consistency group having a third set of storage containers.

14. The system of claim 10 wherein each member of the second set of storage containers is associated with a universally unique identifier stored in a database of the storage system.

15. The system of claim 13 wherein the second consistency group is a second child object of the first consistency group in the hierarchical namespace of the storage system, and wherein the second consistency group is destroyable without deleting the third set of storage containers.

16. The system of claim 10 wherein a pathname in the hierarchical namespace for each first child object of the first consistency group is unique within the namespace.

17. The system of claim 15 wherein the storage I/O is stack further configured to:
destroy the second consistency group such that the first consistency group becomes a parent of the third set of storage containers.

18. A non-transitory computer readable medium including program instructions for execution on a processor of a storage system, the processor executing a storage input/output (I/O) stack, the program instructions configured to:
receive an administrative command directed to a first set of storage containers to create a first consistency group;
process the administrative command for each member of the first set of storage containers to create the first consistency group having a second set of storage containers, wherein each member of the second set of storage container is created as a result of the processing of the administrative command on a corresponding member of the first set of storage containers, wherein each member of the first set of storage containers is a child object of the first consistency group in a hierarchical namespace of the storage system;

determine whether the processing of the administrative command for a member of the first set of storage containers completes unsuccessfully; and in response to determining that the processing of the administrative command for the member of the first set of storage containers completes unsuccessfully, delete all members of the second set of storage containers and return an unsuccessful completion to the received administrative command to create the first consistency group.

* * * * *